US008118681B2

(12) United States Patent
Mattice et al.

(10) Patent No.: US 8,118,681 B2

(45) Date of Patent: Feb. 21, 2012

(54) GAMING SYSTEM HAVING RETRACTABLE GAMING UNIT

(75) Inventors: Harold E. Mattice, Gardnerville, NV (US); Chris Gadda, Las Vegas, NV (US); Chan Griswold, Reno, NV (US); James Stockdale, Clio, CA (US); Richard Wilder, Sparks, NV (US)

(73) Assignee: IGT, Reno, NV (US)

( * ) Notice: Subject to any disclaimer, the term of this patent is extended or adjusted under 35 U.S.C. 154(b) by 1160 days.

(21) Appl. No.: 11/786,842

(22) Filed: Apr. 12, 2007

(65) Prior Publication Data

US 2008/0254862 A1 Oct. 16, 2008

(51) Int. Cl.
*A63F 13/00* (2006.01)

(52) U.S. Cl. .................. 463/46; 463/7; 463/16; 463/23; 463/47

(58) Field of Classification Search ................ 463/7, 16, 463/23, 46, 47
See application file for complete search history.

(56) References Cited

U.S. PATENT DOCUMENTS 6,149,522 A 11/2000 Alcorn et al.
6,256,040 B1 * 7/2001 Tanaka et al. ................. 345/421
6,264,561 B1 7/2001 Saffari et al.
6,620,047 B1 9/2003 Alcorn et al.
6,962,530 B2 11/2005 Jackson
7,364,505 B2 4/2008 Mattice et al.
7,494,418 B2 * 2/2009 Rifkin et al. .................... 463/46
2003/0078103 A1 4/2003 LeMay et al.
2004/0224777 A1 * 11/2004 Smith et al. ...................... 463/47
2005/0192099 A1 9/2005 Nguyen
2006/0281558 A1 * 12/2006 Rifkin et al. ..................... 463/46
2008/0254862 A1 * 10/2008 Mattice et al. .................. 463/25

* cited by examiner

*Primary Examiner* — Pierre Eddy Elisca
*Assistant Examiner* — Shahid Kamal
(74) *Attorney, Agent, or Firm* — Armstrong Teasdale, LLP

(57) ABSTRACT

Various aspects are directed to a gaming system configured or designed for use with a bar top or table top. In at least one embodiment, the gaming system may include a movable gaming unit, the movable gaming unit which is operable to be lowered below an upper surface of the bar top or table top, and which is operable to be raised, at least partially, above the upper surface of the bar top or table top. In at least one embodiment, the gaming system may be operable to control a wager-based game played on the gaming system. The gaming system may be further operable to lower the gaming unit below the upper surface of the bar top or table top in response to detecting at least one first condition or event. The gaming system may be further operable to raise a first portion of the gaming unit above the upper surface of the bar top or table top in response to detecting at least one second condition or event.

20 Claims, 15 Drawing Sheets

500

GAMING SYSTEM HAVING RETRACTABLE GAMING UNIT

BACKGROUND

This invention relates to gaming machines such as slot machines and video poker machines, particularly those which have been installed into a bar top, table top, or other working surface.

Casinos are noisy, crowded environments where difficulties are often encountered by patrons in locating available gaming machines at bars, keno lounges, restaurants, sports book areas, etc. Moreover, assuming that a patron has acquired use of a gaming machine, it is often difficult for the patron to retain or reserve use of the machine if the patron leaves the gaming machine even for a short period of time.

In order to maximize the available floor space of a gaming establishment, gaming operators have resorted to installing gaming machines at a variety of different locations within a casino including, for example, restaurants, bars and/or other locations.

For example, it is quite common in gaming jurisdictions for bar tops to be constructed with gaming machines installed into them. Typically, such gaming machines are permanently mounted into or onto the bar top, and as a result, create an uneven surface for the player to place his or her drink. Additionally, the bar top-installed gaming machines are typically fixed in that the bar top can not be modified for a person wanting to drink but not gamble. Additionally, such bar top-installed gaming machines make it difficult for regions surrounding the bar top gaming machine to be properly cleaned.

In a restaurant, it is typically undesirable to place a gaming machine into a tabletop because most of the time the tabletop is being used for food service. Thus, the only casino game that is typically played within a restaurant is keno, which, for example, may involve use of a keno "runner," or may involve the player periodically getting up and leaving the restaurant area to place his or her bet.

In keno lounge areas, a player typically marks his or her keno ticket and then takes the ticket up to a counter where it is marked by a keno operator. After this is done, the player may have to stand if his or her seat has been occupied by another player. Some keno player's keep track of the numbers that come up on the keno board and make there bets accordingly. Such situations may require the use of a relatively large amount of space for each player and his or her associated papers. Further, each time a player desires to place a bet, he or she must gather up all of his or her papers before going up to the counter to place the bet. Needless to say, this is time consuming process, which, on occasion, may result in a player failing to place a desired bet and/or losing the place where the player was previously sitting.

In a sports book area the tables are typically used for laying out papers to create betting strategies and/or to predict future sports play activities and/or outcomes. Upon completing such analysis, it is typically necessary for the player to go to a counter to place his or her bet. This consumes time because a player must collect all of his or her papers, and then go up to the counter to participate in the betting process. Additionally, in a busy sports book area, the person may loose his or her while waiting to place his or her bet(s).

Thus, it will be appreciated that conventional gaming and betting techniques may involve a number of inconveniences for players and/or other patrons.

SUMMARY

Various aspects of a specific embodiment are directed to a gaming system configured or designed for use with a bar top or table top. In at least one embodiment, the gaming system may include, but is not limited to, one or more of the following (or combination thereof): a master gaming controller, memory, at least one interface for communicating with at least one other device in a gaming network, and a movable gaming unit, the movable gaming unit being operable to be lowered below an upper surface of the bar top or table top, the movable gaming unit being further operable to be raised, at least partially, above the upper surface of the bar top or table top. In at least one embodiment, the gaming system may be operable to control a wager-based game played on the gaming system. The gaming system may be further operable to lower the gaming unit below the upper surface of the bar top or table top in response to detecting at least one first condition or event. The gaming system may be further operable to raise a first portion of the gaming unit above the upper surface of the bar top or table top in response to detecting at least one second condition or event.

Other aspects are directed to different methods, systems, and computer program products for operating a bar top or table top gaming system which includes a movable gaming unit operable to be lowered below an upper surface of the bar top or table top, and operable to be raised, at least partially, above the upper surface of the bar top or table top. In at least one embodiment, at least one operation may be initiated for controlling a wager-based game played on the gaming system. The gaming unit may be lowered below the upper surface of the bar top or table top in response to detecting at least one first condition or event. A first portion of the gaming unit may be raised above the upper surface of the bar top or table top in response to detecting at least one second condition or event. Further, in at least some embodiments, a first set of criteria may be identified which is to be satisfied before allowing the gaming unit to be lowered. In at least one embodiment, lowering of the gaming unit may be delayed in response to determining that the first set of criteria is not satisfied. In at least some embodiments, a second set of criteria may be identified which is to be satisfied before allowing the gaming unit to be raised. In at least one embodiment, raising of the gaming unit may be delayed in response to determining that the second set of criteria is not satisfied.

Additional objects, features and advantages of the various aspects of a specific embodiment will become apparent from the following description of its preferred embodiments, which description should be taken in conjunction with the accompanying drawings.

DETAILED DESCRIPTION OF EXAMPLE EMBODIMENTS

Figure 1A:
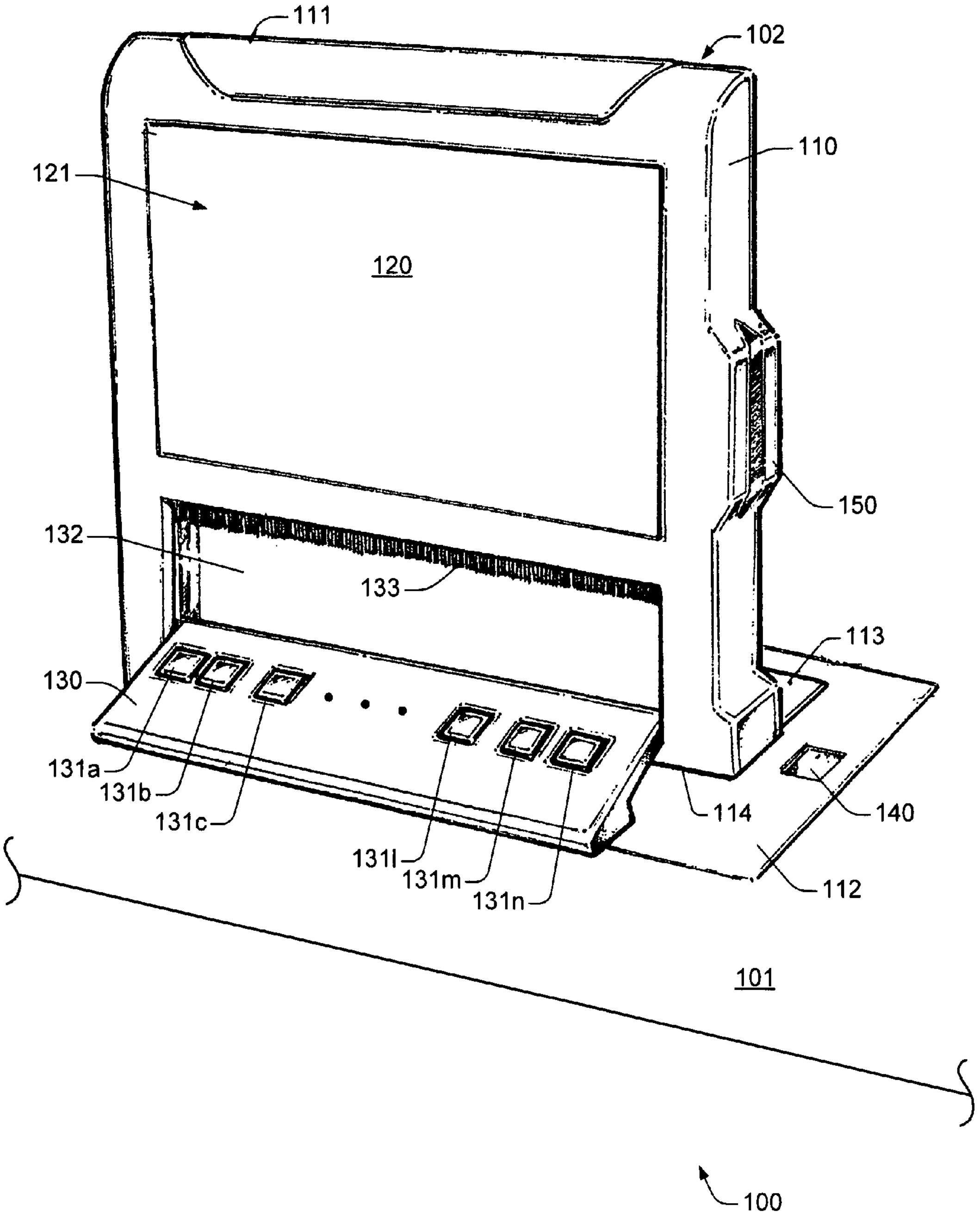
FIGS. 1A-1C illustrate perspective views of examples of different gaming system embodiments which may be used for implementing various features described herein.

One or more different inventions may be described in the present application. Further, for one or more of the invention (s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention (s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of one or more of the invention (s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention (s), and does not imply that the illustrated process is preferred.

When a single device or article is described, it will be readily apparent that more than one device/article (whether or not they cooperate) may be used in place of a single device/ article. Similarly, where more than one device or article is described (whether or not they cooperate), it will be readily apparent that a single device/article may be used in place of the more than one device or article.

The functionality and/or the features of a device may be alternatively embodied by one or more other devices that are not explicitly described as having such functionality/features. Thus, other embodiments of one or more of the invention(s) need not include the device itself.

Modern gaming machines are rigid devices that impact the bar top because it protrudes above the top surface, can not be installed into restaurant tables because of a need for a flat surface to facilitate food surface, are not used in keno and sports book areas because of lack of floor space.

The installation of a gaming machine into a bar top has created many design problems. The major problem has been the drastic change to the top of the bar. These changes were made to accommodate the CRT display and the player panel.

For example, in one embodiment where the size of the bar top is about 27 inches by 17 inches, and the size of the CRT is about 13 inches by 11 inches, the CRT takes up about 30% of the available bar top area. Further, a player panel having dimensions of about 2 inches by 13 inches takes up about 6% of the bar top area. Together, these two items consume about 36% of the available surface area 100% of the time.

Heat ventilation is another problem. The CRT generates a large amount of heat inside the gaming machine cabinet. This heat is trapped in the cabinet because of lack of ventilation from the cabinet. The heat can not be vented out the back or sides of the cabinet because it is generally installed up against other equipment. It can not be vented out the front because it would cause discomfort to the player.

Another problem is created when a person wants to have a drink at the bar but does not want to play the gaming machine. There is no room on the top of the bar for his drink, cigarettes, ash tray, keys, change, cell phone and the like. The majority of the surface is taken up with the CRT and player panel.

As described in greater detail below, various embodiments of gaming systems, gaming machines, or gaming units described herein may include an LCD monitor and player panel which can be retract down into the bar top, and extended up out of the bar top, as desired by a player or user. In this way, the bar top may be left in a relatively uncluttered state while the gaming machine is retracted and not in use. It also minimizes the heat trapped in the gaming machine, for example, by allowing power to the LCD and/or other components of the gaming unit to the shut down or reduced, for example, at times when the gaming unit is in its retracted position. It also provides a ventilation path for the heat to escape out the top of the monitor. In one embodiment, heat ducts may be provided in the back of the LCD to help remove heat from the top of the gaming machine. This may be particularly effective when the gaming unit is in its "up" or extended position. Further, since LCD's typically consume much less energy and produce less heat than CRT monitors, power consumption and heat production of the gaming units may be significantly reduced.

In at least one embodiment, the retractable table top or bar top gaming unit may also be able to provide a larger writing surface (e.g., than conventional bar top gaming units) for persons who do not wish to interact with the gaming unit. Thus, for example, according to one embodiment, with the LCD monitor and player panel retracted down into the bar top, the entire area of the bar top is available for a person's drink, papers, cigarettes, ash tray, keys, change, cell phone, purse and the like.

In one aspect, at least one embodiment is directed to a gaming unit that may be raised or lowered above or below a bar top or tabletop thus providing the bar top or tabletop with a substantially flat surface when the gaming unit is in a fully lowered position. In at least one embodiment, a cashless system may be utilized for various activities such as, for example: betting or wagering activity conducted at the gaming unit; gaming activity conducted at the gaming unit; entertainment activity (e.g., booking tickets, shows, etc.) conducted at the gaming unit; food and/or drink service conducted at the gaming unit; etc. According to specific embodiments, gaming activity conducted at the gaming unit may be recorded for player tracking, wagers won/lost may be added/deducted from a player's gambling account. Food and beverages ordered by a player may be deducted from the same or a different player's account.

In one aspect, at least one embodiment is directed to a retractable gaming unit that may be installed into a bar top or table, thereby creating an activity region that may be used for more than one purpose. For example, when the gaming unit is retracted below the bar top, the bar top surface can be used for placing drinks, astray, cigarettes, car keys, marking keno tickets, or just relaxing on the bar. Food may also be served or placed on this surface. At a bar table, the gaming unit can be lowered below the table surface, for example, to avoid the gaming unit from being a visual obstruction. For example, the gaming unit may be lowered in order to allow people across from each other to have a conversation without the gaming unit getting in the way. By lowering the gaming unit, it is also possible to access and clean regions of the tabletop or bar top that would otherwise be obstructed by all of the protruding elements that are associated with non-retractable bar top gaming units.

In another aspect, at least one embodiment is directed to the installation and operation of a gaming unit installed into a restaurant table thus creating a surface that may be used for more than one purpose. For example, when a player is seated at a restaurant table he or she could raise the gaming unit and review a food menu that would be available as one of the functions of that gaming unit. The player could place an order for food and drink from the gaming unit. After this has been done, the player could then play his or her favorite game on that same gaming unit. When the food and drink arrive at the table for his consumption, the player could lower the gaming unit and consume his or her food and drink. Upon completion, the player could return to game play.

In some embodiments, Keno tickets could be marked by the player at that retractable gaming unit (e.g., at the restaurant, bar, pool, lounge and/or other locations). The keno ticket could be electrically delivered to the keno counter and an electronic keno ticket could be played for the player of the gaming unit. In one embodiment, this could all take place without a keno runner. Alternatively, a keno runner could deliver the keno ticket to the player if needed.

According to specific embodiments, the retractable gaming unit could be lowered or raised as desired by a player, patron, casino employee, and/or other authorized persons. In at least one embodiment, the age of a person desiring to raise the gaming unit may first be verified before enabling the gaming use it to be raised or activated. In another embodiment, an under age person may be able to raise the gaming unit, but gaming and wagering functionality of the gaming unit would be disabled. In one embodiment, the retractable gaming unit may be operable to verify the age of a person or user, and/or may be operable to determine whether the user is a registered player or player tracking member. In at least one embodiment, if the gaming unit is unable to determine or verify the user's age, functionality of the gaming unit may be restricted to specific activities. For example, the gaming unit may be configured to allow the user to order food and drink from the restaurant but not alcohol.

In yet another aspect, at least one embodiment is directed to a retractable gaming unit that may be installed into a keno table or keno chair. This would enable a player to play an electrically delivered keno ticket. The player would not need to get out of his or her seat to execute the game play and could remain seated. The player's paperwork could remain in place. This would expedite game play by minimizing the number of players that need to go to the counter to get their tickets marked. Beverages could also be ordered by the player (e.g., via the retractable gaming unit) without requiring the player to leave his or her seat. If a player did not want to use the gaming unit, he or she could cause the gaming unit to retract, for example, by pushing an appropriate button, sensor, or other input device. In one embodiment, the player could activate the gaming unit to rise out of the keno tabletop or chair, for example, by placing his or her player tracking card in a specified location, and/or by placing a finger on the fingerprint reader.

In another aspect, at least one embodiment is directed to the installation and operation of a retractable gaming unit installed into a sports book table or sports book chair. An electrical bet could be placed from the retractable gaming unit installed into the sports book table or chair. This would enable the player to keep better track of the ongoing races, betting options, play options and the like without getting out of his or her seat. Drinks could also be ordered by the player (e.g., via the retractable gaming unit) without requiring the player to leave his or her seat. This would enable the player to concentrate on the game and not on getting service from the casino personal.

At least one embodiment is also directed to a retractable gaming unit that may comprise, for example, a CPU for process and state control, RAM for temporary data storage, ROM for process storage, mass storage units for game programs, video data, audio data storage, a retractable display unit for displaying video images processed by the CPU, a touch screen overlay is used as an input device for controlling the game play and controlling the retraction of the retractable mechanism, a keyboard (virtual or real) for program control inputs, a sound system for producing sounds, a biometric reader (such as, for example, a fingerprint reader) for player verification, sensors, switches and indicator lights for game play and control, communication modules for communicating with other devices, an electrically controlled retractable mechanism to raise and lower the gaming unit into and out of a table top, bar top, wall, floor, and/or other suitable structures which may be configured or designed to house a retractable gaming unit.

In another aspect, at least one embodiment is directed toward various systems and/or methods which control the operations of the electrically controlled retractable mechanism(s) of the retractable gaming unit. Such systems/methods may be used to raise the gaming unit above a tabletop upon the satisfaction of one or more specified conditions and/or events (such as, for example, input from a player or other user), and/or to lower the gaming unit below the tabletop upon the satisfaction of one or more specified conditions and/or events.

According to specific embodiments, the retractable gaming unit may be operable to engage in a variety of game play activities, wagering activities, etc. For example, in one embodiment, games that may be available to the player may include video casino games of chance such as, for example (but not limited to): card games such as poker, baccarat, blackjack, Faro, etc.; video spinning reel games such as black rhino, cops and donuts and double diamonds; board games such as bingo, keno, checkers and the like; etc.

In at least some embodiments, the retractable gaming unit may include functionality for processing player requests for food and/or beverages. This will enable a player at one of these gaming stations to place an order for food and/or drinks with minimal inconvenience, thereby allowing the player to focus their attention on game play or wagering activities.

Example Gaming System Embodiments

FIG. 1A is a perspective view of a gaming system 100 having a retractable gaming unit 102 in accordance with a specific embodiment. As shown in the example of FIG. 1A, gaming unit 102 is shown protruding from a bar top or tabletop. For purposes of illustration, it will be assumed that gaming system 100 has been mounted into a bar which has an interior cavity (not shown), and bar top surface 101.

In at least one embodiment, the bar top includes an opening or cavity (not shown) for allowing the gaming unit 102 to be retracted into the interior cavity, and to be extended above the bar top surface, as shown in FIG. 1A.

The gaming unit 102 may included an exterior housing 110. According to specific embodiments, the housing 110 may be constructed using a variety of different materials such as, for example, metals, plastics, wood, and the like. In one embodiment, at least a portion of housing 110 is constructed using a molded poly urethane material.

As illustrated in FIG. 1A, gaming unit 102 includes a service candle 111, which, for example, may be operable to display a variety of colors, patterns, sequences of colors, etc. For example, in one embodiment, the service candle may be illuminated from within using multi colored LED's (not shown) in such a way that many different colors can be displayed. In one embodiment, the candle 111 may be configured or designed to display a minimum of 3 different colors, which may be used to communicate various types of information to casino employees or other service personnel. For example, according to specific embodiments, the service candle 111 may be used to annunciate different game states and/or to provide a visual output to service people such as bar tenders and service personnel. In at least some embodiments, service candle 111 may include at least a portion of functionality similar to that described in U.S. patent application Ser. No. 10/244,772 by Mattice et al., herein incorporated by reference in its entirety.

As illustrated in FIG. 1A, gaming system 100 includes a mounting plate 112, which, for example, may be made of suitable material such as, for example, plastic, metal, wood, etc. In one embodiment, mounting plate 112 may be constructed using cold rolled steal plated on its exterior with a chrome finish, and designed to provide a substantially water tight seal to the bar top or tabletop 101, so as to prevent food and/or liquid from leaking into the interior of the tabletop or bar top cavity where the retractable gaming unit is housed. In one embodiment, the mounting plate 112 may be attached to the bar from the underside of the bar top.

Additionally, as illustrated in FIG. 1A, gaming system 100 includes a cover plate or sealing plate 113 which may be used to cover the opening to the interior cavity, for example, at times when the gaming unit is in its retracted position. In one embodiment, cover plate 113 may be movably secured to mounting plate 112, for example, via one or more hinges. In at least one embodiment, a spring hinged mechanism (not shown) may be used to allow the cover plate 113 to be moved out of the way of the opening to the interior cavity at times when the gaming unit 102 is raised or extended, and to allow the cover plate 113 to automatically cover the opening to the interior cavity at times when the gaming unit is lowered or retracted. In at least one embodiment, the hinges may be mounted under the bar top surface and/or recessed. According to different embodiments, cover plate 113 may be made of suitable material such as, for example, plastic, metal, wood, etc. In one embodiment, cover plate 113 may be constructed using cold rolled steal plated on its exterior with a chrome finish, and designed to provide a substantially water tight seal with mounting plate 112, so as to prevent food and/or liquid from leaking into the interior of the tabletop or bar top cavity where the retractable gaming unit is housed.

Figure 9:
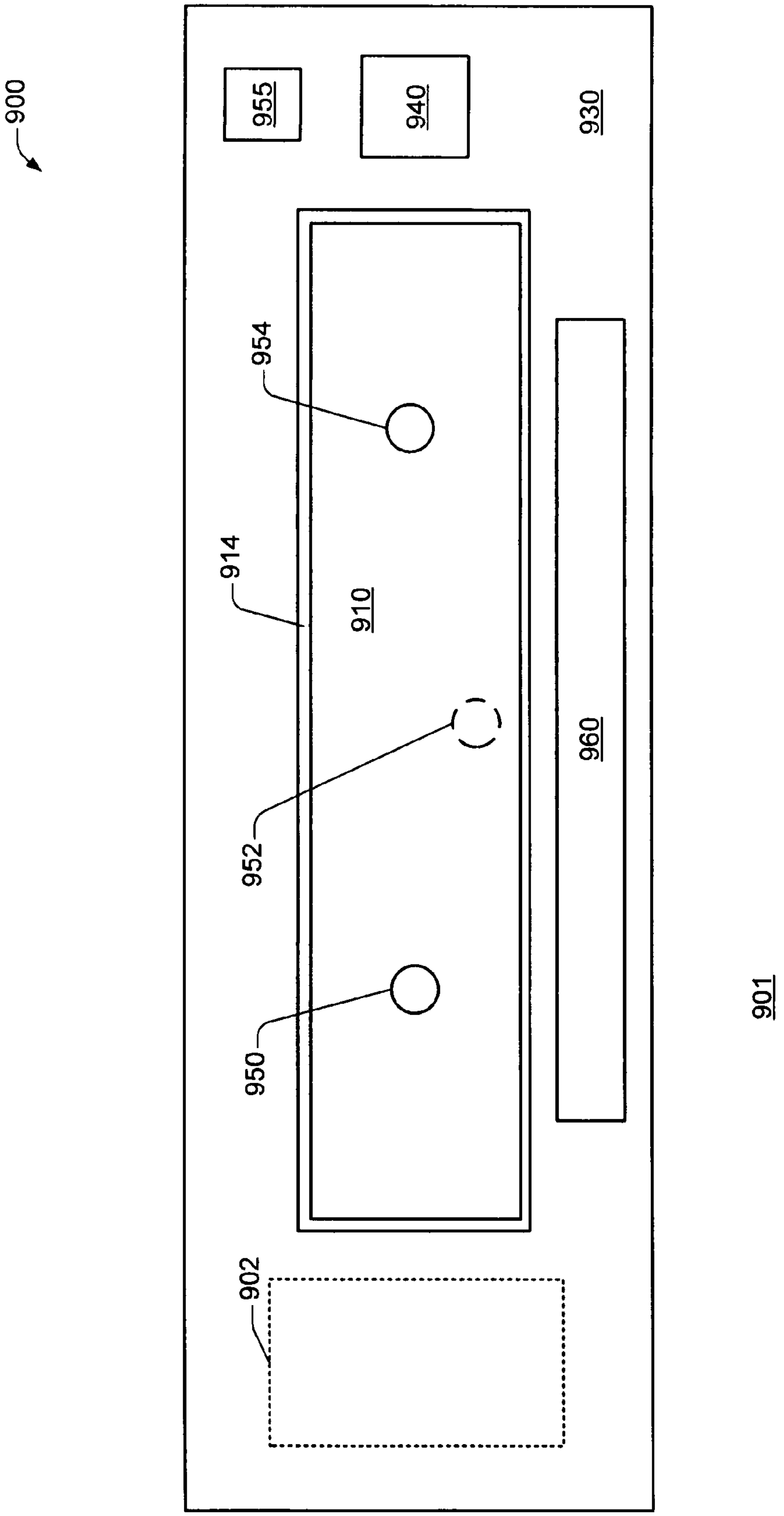
FIG. 9 shows a top view of a specific embodiment of various gaming system components which have been mounted into a bar top or table top.

In other embodiments, as illustrated, for example, in FIG. 9 of the drawings, portions of mounting plate 930 and/or cover plate 910 may be comprised of clear hardened materials such as, for example, acrylic, plexiglass, polycarbonate, glass, etc. Additionally, one or more sensors and/or other devices may be installed or mounted on and/or beneath the top surface of the mounting plate 930 and/or cover plate 910. For example, mounting plate 930 (and/or cover plate 910) may include at least one display (e.g., 960) which, for example, may be used to display a variety of information such as, for example: error conditions detected at the gaming system, user instructions, promotions, alerts, game played information, wager information, etc. Additionally, as illustrated in the example embodiment of FIG. 9, mounting plate 930 may include, for example, a biometric information reader/detector (e.g., fingerprint reader 940), gaming system status indicators (e.g., LED's 955), a card reader mechanism (e.g., 902), etc. In at least one embodiment, suitable sealing mechanisms (e.g., gaskets, o-rings, silicon, etc.) may be used to provide a substantially watertight seal for any device or component which is mounted onto or into the top surface of the mounting plate 930 and/or cover plate 910.

In one embodiment, region 902 may be configured or designed as a wireless and/or mobile device docking station which include features such as, for example, a wireless communication interface, a wireless power distribution interface, etc. For example, in one embodiment, docking station 902 may include various functionality such as, for example: energizing and/or detecting RFID-enabled player tracking cards, charging and/or recharging wireless mobile devices, transmitting and/or receiving information to/from wireless communication devices (such as, for example, RFID-enabled player tracking cards), determining an identity and/or other characteristics associated with owners of detected RFID-enabled player tracking cards, reading data from player tracking cards, writing data to player tracking cards, etc. In one embodiment, a player may place his or her RFID-enabled player tracking card within the region 902 to activate and/or raise the gaming unit (e.g., 902). Additionally, in at least one embodiment, information from the detected RFID-enabled player tracking card may be used to enable and/or disable various features of the gaming unit.

Additionally, as illustrated in FIG. 9, one or more sensors (e.g., 950, 952, 954) may be mounted on the surface of or within the body of cover plate 910 and/or mounting plate 930. Such sensors may include, but are not limited to, one or more of the following (or combination thereof): light sensors, pressure sensors, moisture sensors, CCD camera, acoustic and the like. For example, as illustrated in the example embodiment of FIG. 9, at least one light sensor (e.g., 950) may be used to detect or measure ambient light conditions at or near cover plate 910 in order to detect the presence of any object(s) which may obstruct the opening of the cover plate. According to specific embodiments, at least one light sensor may be mounted on the top surface of the cover plate 910 and/or mounting plate 930. In some embodiments, such as, for example, where the cover plate 910 and/or mounting plate 930 is comprised of a clear plastic material, at least one light sensor may be mounted beneath the top surface of the cover plate 910 and/or mounting plate 930.

In at least one embodiment, the gaming system may be configured or designed to prevent the gaming unit from being raised in response to detecting a "low light" condition at light sensor 950. In one embodiment, a low light condition may be triggered when light sensor 950 fails to detect a minimum threshold of light. Such a situation, may occur, for example when a plate or glass has been placed on the bar top over sensor 950.

In at least one embodiment, at least one pressure sensor (e.g., 952) may be used to detect or measure pressure conditions at or near cover plate 910 in order, for example, to detect the presence of any object(s) which may obstruct the opening of the cover plate. In at least one embodiment, the gaming system may be configured or designed to prevent the gaming unit from being raised in response to detecting a "high pressure" condition at pressure sensor 952. In one embodiment, a high pressure condition may be triggered when pressure sensor 952 detects a pressure value which exceeds a predetermined value. Such a situation, may occur, for example when a plate, glass, or other object(s) have been placed on the bar top cover plate 910.

In at least one embodiment, at least one at least one moisture sensor (e.g., 914, 954) may be used to detect or measure moisture level conditions at or near mounting plate 930 and/or cover plate 910 in order, for example, to detect the presence of any liquids at or near the cover plate opening. In at least one embodiment, the gaming system may be configured or designed to prevent the cover plate from opening in response to detecting a "high moisture" condition at one or more of the moisture sensor(s) (e.g., 914, 954). In one embodiment, a high moisture condition may be triggered when at least one moisture sensor (e.g., 914, 954) detects the presence of a liquid.

In at least one embodiment, additional moisture sensors may be mounted within the interior cavity, and may be used for detecting elevated moisture conditions which may adversely affect the mechanical and/or electrical components of the gaming system. In one embodiment, the gaming system and may be configured or designed to temporarily cut off the power supply to the gaming unit and/or other devices of the gaming system in response to detecting a higher moisture condition within the interior cavity. Such a high moisture condition may be triggered, for example, when the presence of liquid is detected within the interior cavity.

In an alternate embodiment (not shown) cover plate may be mounted onto the top portion of gaming unit in a manner such that the cover plate is raised and/or lowered along with the raising and/or lowering of gaming unit 102. Further, in at least one embodiment, the cover plate may be mounted to the top surface of the gaming in a manner such that, when the gaming unit is fully retracted into the interior cavity, the cover plate is positioned to cover and seal the opening to the interior cavity.

In at least one embodiment, gaskets and/or other sealing mechanisms may be installed (1) at the interface between the mounting plate and bar top, and/or (2) at the interface between the mounting plate and cover plate, in order, for example, to improve the effectiveness of the seals at one or more of these interfaces. Thus, for example, in at least one embodiment, when the gaming unit is retracted and the cover plate is positioned to cover the opening to the interior cavity, the top of the bar will be substantially "liquid proof." If a drink is spilled on the bar top no liquid will get into the electronics under the bar top.

Additionally, in at least one embodiment, the bottom portion of the retractable gaming unit may be configured or designed to interface with the interior cavity opening in a manner such that, when the gaming unit is fully raised to its active position, the bottom portion of the retractable gaming unit form a tight seal with the interior cavity opening sufficient to prevent liquids and/or other objects from leaking or otherwise penetrating into the interior cavity.

In at least one embodiment, when the gaming unit has been placed into its fully retracted position (e.g., within the interior cavity of the bar), the top surfaces of the cover plate and mounting plate may form a substantially flat region on the bar top surface. This will allow the bar top to be uncluttered, and/or available for other uses, for example, at times when the player does not want to use the gaming unit.

As illustrated in FIG. 1A, gaming unit 102 may include at least one display such as display unit 120. According to specific embodiments, display unit 120 may be implemented using a variety of different display types and/or display technology such as, for example, flat, bent, curved and/or flexible displays implemented using, for example, Liquid Crystal Display (LCD) technology, Light Emitting Diode (LED) display technology, plasma display technology, Organic Light Emitting Diode (OLED) display technology, and/or any other technology that may be incorporated into a thin design. In at least one embodiment, the display unit may be configured or designed to in such a way so as to permit it to be retracted down into the interior cavity of the bar when not in use. Further, in at least one embodiment, the display unit may be configured or designed to be movable and/or adjustable. For example, in one embodiment, the display unit may be configured or designed to be adjustable in a manner which allows the display unit to be tilted forward, downward, backward, and/or upward; moved about a horizontal axis; moved about a vertical axis; rotated; etc. For example, In at least one embodiment, a player may adjust the tilt of the display unit 120 to reduce glare, improve the appearance of content displayed on the screen, etc.

As illustrated in FIG. 1A, gaming system 100 may include a card reader (e.g., optical card reader, magnetic card reader, RFID card reader) 150. For example, in one embodiment, card reader 150 may be configured to include functionality similar to that of a card swiping reading device. This type of reader requires very little space and, in at least one embodiment, may be incorporated into the bezel around the display unit. In at least one embodiment, card reader 150 may include functionality for reading data from player tracking cards, and/or for writing data to player tracking cards.

In at least one embodiment, at least a portion of the display unit 120 may include a touchscreen surface 121, which, for example, may be configured for use as a user input mechanism. Gaming unit 102 may also include other types of input mechanisms such as for example, button panel(s) (e.g., 130, 301*b*, 301*e*), keyboard(s) (e.g., 301*a*, 301*c*), virtual button panel(s) (e.g., 430), virtual keyboards, etc.

In at least one embodiment, combination button panel/keyboard device may be used which includes a button-type interface on one side/surface, and a keyboard-type interface on another side/surface (e.g., the opposite side). Examples of various button panel/keyboard devices are illustrated, for example, in FIGS. 3A-3D of the drawings. In other embodiments (not shown) a single side of an input device may include both a button-type interface and a keyboard-type interface.

In at least one embodiment, a button panel/keyboard device may be configured or designed to be flipped over in order to allow a user to access the button panel and/or keyboard. This will give the player an option of playing a casino game with the button panel side (which, for example, may be configured as a player panel), and/or may provide an opportunity for the player perform other activities (such as, for example, connecting to the internet) using the keyboard side.

Figure 3A:
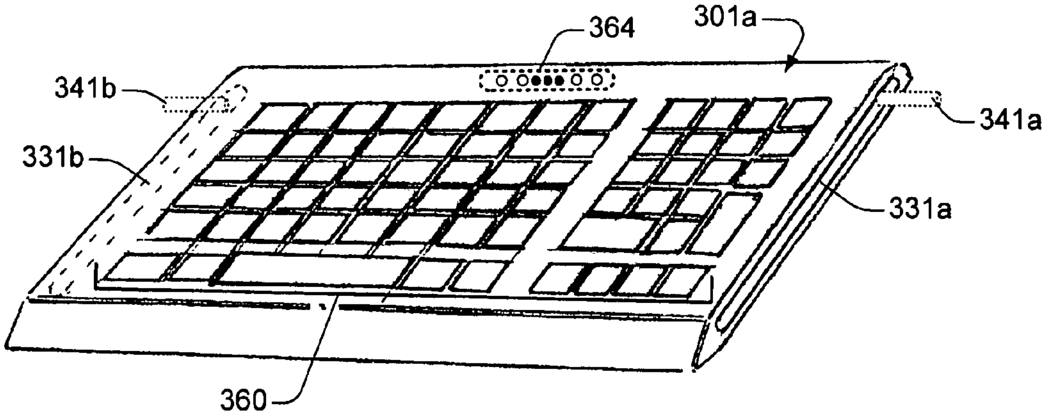
FIGS. 3A-3F illustrates various examples of different button panel/keyboard device embodiments.
Figure 3B:
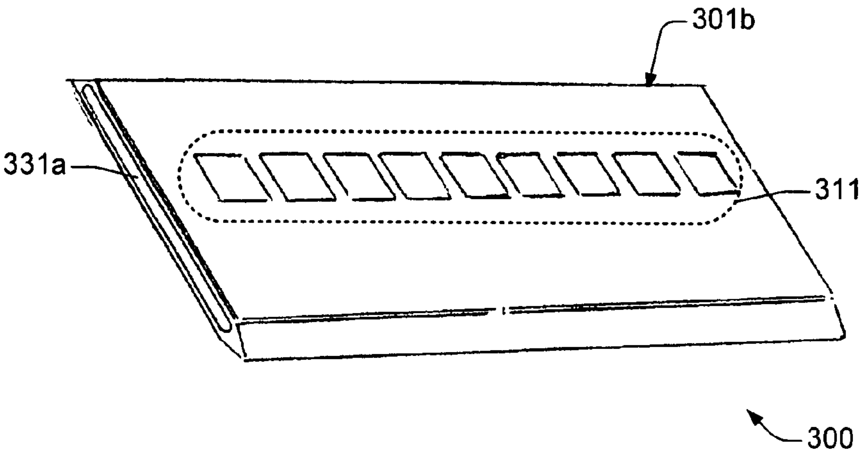

FIGS. 3A-3F illustrates various examples of different button panel/keyboard device embodiments. In at least one embodiment, as shown, for example, in FIGS. 3A and 3B, a button panel/keyboard device 300 may include a button-type interface (e.g., 311) on one side (e.g., 301*b*), and a keyboard-type interface (e.g., 360) on another side (e.g., 301*a*). In at least some embodiments, either or both of sides 301*a*, 301*b* may also include one or more status indicators (e.g., 364), which, for example, may include one or more LEDs. In the specific embodiments of FIGS. 3A and 3B, the button panel/keyboard device 300 includes a plurality of channels (e.g., 331*a*, 331*b*) or grooves which are configured or designed to allow the button panel/keyboard device 300 to be moveably secured to the gaming unit body, for example, via pins 341*a*, 341*b*. In one embodiment, pins 341*a, b* may be inserted into channels 331*a, b* in a manner which allows the button panel/keyboard device 300 to be rotated (e.g., about an axis defined by the relative locations of pins 341*a*, 341*b*) and/or to be moved in one or more directions. In at least one embodiment, the movement of the button panel/keyboard device 300 may be constrained or limited based on the specific pin/channel configurations which have been implemented. For example, in one embodiment, movement of the button panel/keyboard device 300 may be constrained to movements which may be performed by rotating, moving and/or sliding the button panel/keyboard device within the regions defined by the pin/channel interfaces 341*a*/331*a* and 341*b*/331*b*. It will be appreciated that the button panel/keyboard device embodiment illustrated, for example, in FIGS. 3A and 3B provides the ability for a user to flip over the button panel/keyboard device (e.g., in order to access either the button-type interface (311) or keyboard-type interface (360) without physically removing or unsecuring the button panel/keyboard device from the gaming unit.

In at least one embodiment, at least one of the pins (e.g., 341*a* and/or 341*b*) and/or at least one of the channels (e.g., 331*a* and/or 331*b*) may include at least one electrically conductive interface which may be used, for example, to distribute power to the button panel/keyboard device, and/or which may be used to engage in data communication with the button panel/keyboard device. An example of this is shown in FIG. 3C of the drawings.

Figure 3C:
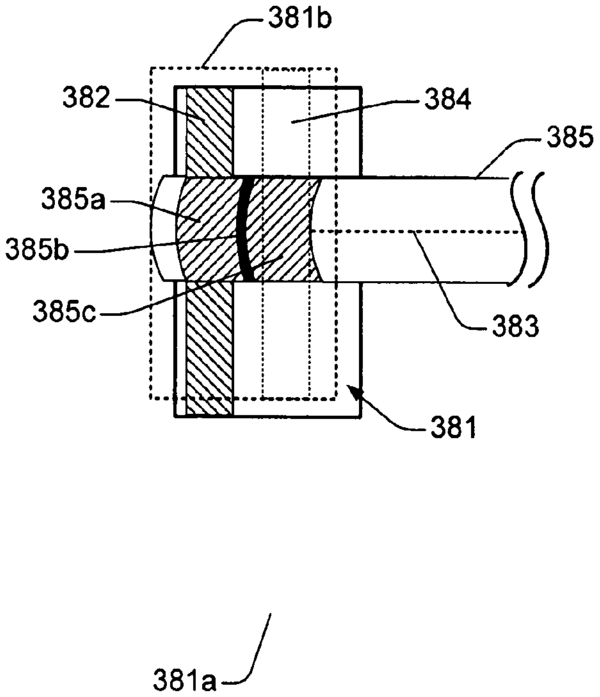

FIG. 3C shows an example embodiment of an electrical interface 380 which may be used for implementing various features and/or aspects described herein. As shown in the example of FIG. 3C, an end portion of pin 385 is received into channel 381, which is at least partially defined by top wall portion 381*b* (shown in phantom for illustrative purposes) and bottom wall portion 381*a*. A first electrically conductive member 382 is mounted to bottom wall portion 381*a*, and a second electrically conductive member 384 (shown in phantom) is mounted to top wall portion 381*b*. In at least one embodiment, the lengths of conductive members 382, 384 may be substantially equal to a total length of the channel 381. Additionally, in at least one embodiment, the first and second electrically conductive members 382, 384 are electrically connected to one or more components within the button panel/keyboard device. Pin 385 includes a first electrically conductive band 385*a* and a second electrically conductive band 385*c*, separated by a non-electrically conductive band 385*b*.

As shown in the example embodiment of FIG. 3C, electrically conductive band 385*a* is electrically coupled to electrically conductive member 382, and electrically conductive band 385*b* is electrically coupled to electrically conductive member 384. In at least one embodiment, the first and second electrically conductive bands 385*a*, 385*c* are electrically connected (e.g., via at least one electrical conduit 383) to one or more components within the gaming unit (not shown).

It will be appreciated that, in alternate embodiments, pin 391 may include any desired number of electrically conductive bands (depending upon specified design constraints), and/or channel 391 may include any desired number of electrically conductive members.

Figure 3D:
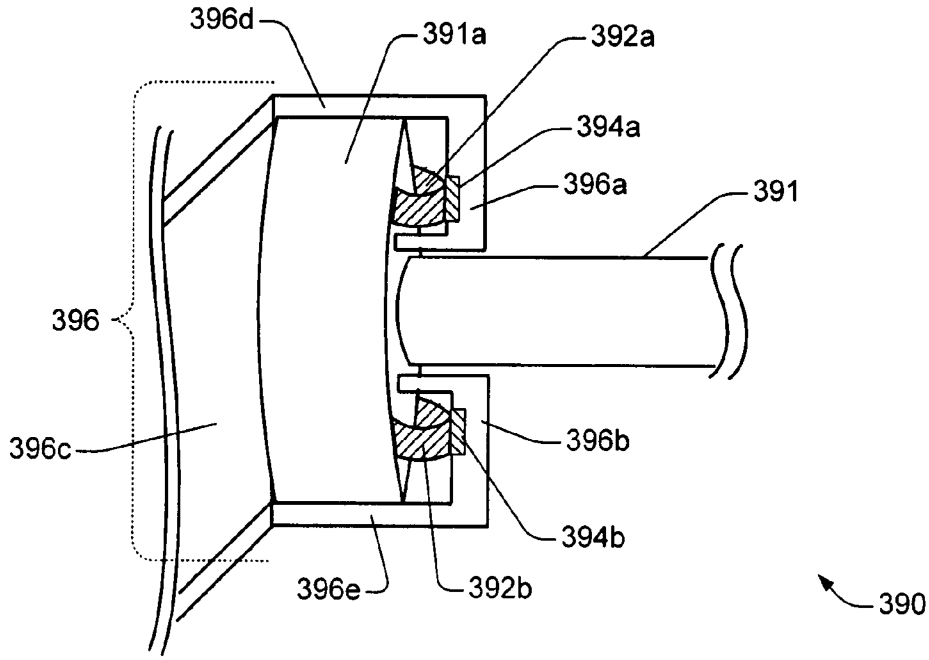

FIG. 3D shows an example of an alternate embodiment of an electrical interface 390 which may be used for implementing various features and/or aspects described herein. As shown in the example of FIG. 3D, an end portion of pin 391 (which, in this example, includes distal end portion 391*a*) is received into channel 396, which is at least partially defined by wall portions 396*a-e*. A first electrically conductive member 394*a* is mounted to wall portion 396*a*, and a second electrically conductive member 394*b* is mounted to wall portion 396*b*. In at least one embodiment, the lengths of conductive members 394*a*, 394*b* may be substantially equal to a total length of the channel 396. Additionally, in at least one embodiment, the first and second electrically conductive members 394*a*, 394*b* are electrically connected to one or more components within the button panel/keyboard device (not shown).

As shown in the example embodiment of FIG. 3D, pin 391 includes an enlarged distal end portion 391*a*, and further includes a first electrically conductive contact member 392*a* and a second electrically conductive contact member 392*b*. In at least one embodiment, electrically conductive contact member 392*a* is electrically coupled to electrically conductive member 394*a*, and electrically conductive contact member 392*b* is electrically coupled to electrically conductive member 394*b*. In at least one embodiment, the first and second electrically conductive contact members 392*a*, 392*b* are electrically connected (e.g., via at least one electrical conduit, not shown) to one or more components within the gaming unit (not shown). Further, In at least one embodiment, electrically conductive contact members 392*a*, 392*b* may be formed using a spring-type contact mechanism in order to facilitate and/or maintain a suitable electrical connection with electrically conductive members 394*a*, 394*b*.

In at least one embodiment, electrical interfaces 380 and/or 390 may be used, for example, to distribute power to the button panel/keyboard device, and/or may be used to engage in data communication with the button panel/keyboard device.

In at least some other embodiments, data communication between the button panel/keyboard device and the gaming unit (and/or gaming system) may be implemented using one or more wireless communication devices and/or wireless communication protocols.

Figure 3E:
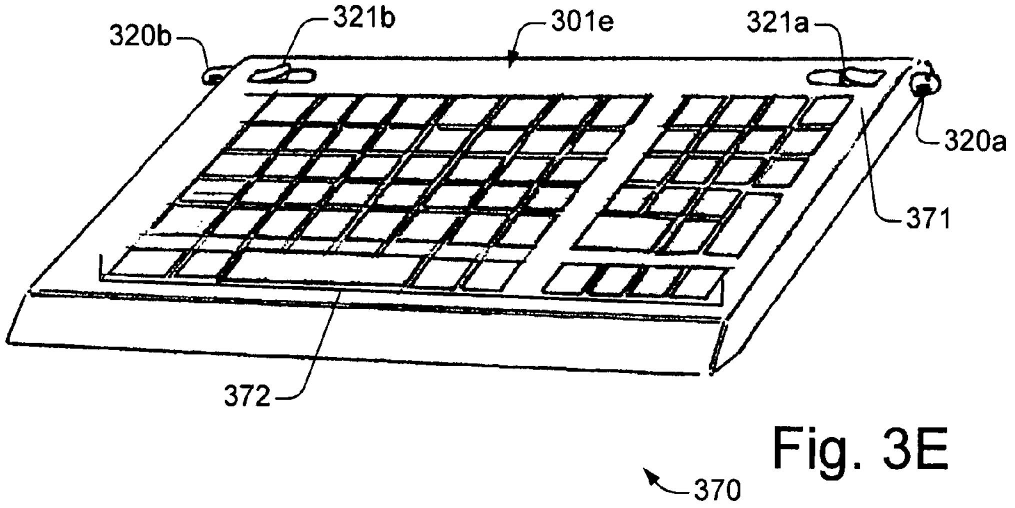
Figure 3F:
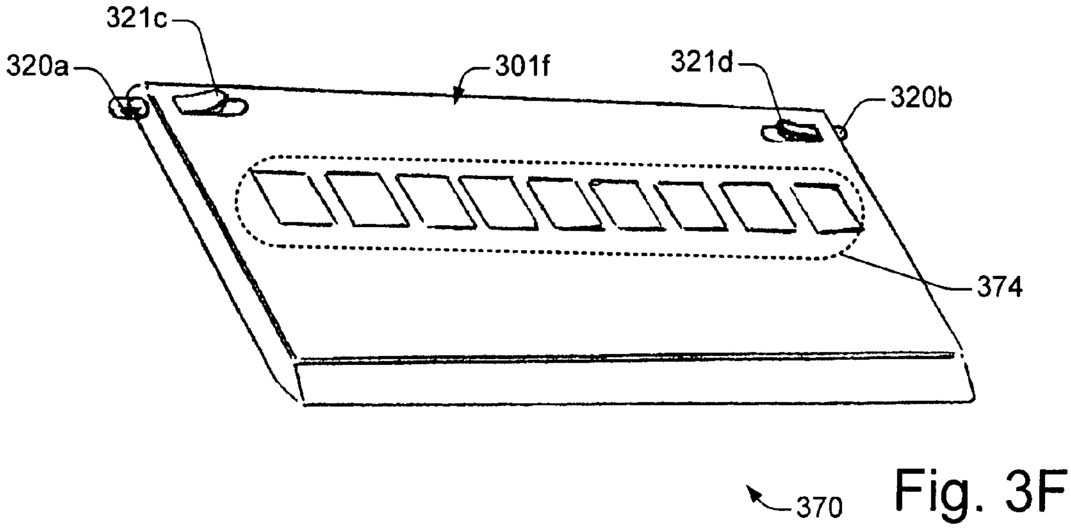

FIGS. 3E and 3F show an alternate embodiment of a button panel/keyboard device 370. As shown in the embodiments of FIGS. 3E and 3F, a button panel/keyboard device 370 may include a button-type interface (e.g., 374) on one side (e.g., 301*f*), and a keyboard-type interface (e.g., 372) on another side (e.g., 301*e*).

As shown in the embodiments of FIGS. 3E and 3F, the button panel/keyboard device 370 may be removeably attached to the gaming unit (e.g., 102) via retractable dowels or pins 320*a*, 320*b*. As shown, for example, in FIG. 3E, retractable dowels 320*a* and 320*b* are located on opposite side panels of the button panel/keyboard device 370. In at least one embodiment, the retractable dowels 320*a, b* may each be retracted via a respective retracting lever (e.g., 321*a, b*). For example, according to one embodiment, by pushing down on retracting levers 321*a* and 321*b*, the retractable dowels 320*a,b* may be retracted (e.g., into the body 371 of the button panel/keyboard device), allowing the button panel/keyboard device 370 to be removed or detached from gaming unit 102. Once removed, the button panel/keyboard device may be flipped over (if desired), and re-attached to the gaming unit.

In one embodiment, the button panel/keyboard device may be re-attached to the gaming unit, for example, by maneuvering the button panel/keyboard device back into the gaming unit such that the retractable dowels 320*a, b* become aligned with the appropriate detents and/or apertures on the gaming unit, at which point the retractable dowels 320*a, b* may latch into their detents/apertures in the gaming unit 102.

In one embodiment, the keyboard-type interface (e.g., 372) may be configured to function as a standard keyboard, which may optionally include a numeric keypad portion. In one embodiment, the keyboard layout may include keys representing the alpha numerical characters of a standard keyboard. Additional keys may be included for providing other types of functionality such as, for example, cursor movement, web-browsing functionality, gaming functionality, wagering functionality, player tracking functionality, service functionality, etc.

FIG. 3F shows an example of a button-type interface 374 in accordance with a specific embodiment. In one embodiment, the side 301(*f*) of the button panel/keyboard device which includes the button-type interface 374 may be referred to as a "player panel." As shown in the embodiment of FIG. 3F, the player panel may include a plurality of buttons or switches (e.g., 374). According to specific embodiments, at least a portion of the buttons/switches may be implemented, for example, using programmable display switches such as those disclosed in U.S. Pat. No. 6,454,649 by Mattice et al., herein incorporated by reference in its entirety. This type of programmable display switch provides different types of labels, legends, indications, instructions and the like depending on the state of the game and/or the type of game being played. Further, in at least one embodiment, at least some of the buttons/switches may include a respective electronic display screen (e.g., LCD display, OLED display, etc.) for displaying various types of content which may be viewed by a player or user. In this way, a wide variety of game functions, denominations, pay tables, game themes, game types and/or other types of gaming-related activities may be implemented while reducing the total number of switches on the gaming unit 102.

According to specific embodiments, portions of the keyboard and/or button panels (e.g., external housing, keys, buttons, etc) may be constructed using molded poly urethane and/or other types of metals and/or plastics. According to different embodiments, different button panels and/or keyboard panels may include different numbers of buttons/keys having different functionalities and/or having different layouts or configurations. For example, returning to the example embodiment of FIG. 1A, button panel 130 includes a plurality of separate buttons (e.g., 131*a*-131*n*).

According to specific embodiments, the button panel/keyboard device (e.g., 130) may be configured or designed to fold up into cavity 132, for example, at times when the gaming unit 102 (and button panel/keyboard device) are retracted below the bar top surface 101. In at least one embodiment, one or more cleaning members (e.g., cleaning bristles 133) may be used to automatically clean debris from the button panel/keyboard device and/or from the gaming unit 102, for example at times when the gaming unit is being retracted and/or extended.

In at least one embodiment, gaming system 100 may also include speakers (not shown). In one embodiment, one or more speakers may be installed into the exterior housing 110 of the gaming unit 102. In an alternate embodiment, one or more speakers may be installed into the mounting plate 112. In at least one embodiment, the speakers may be configured or designed to be water resistant or waterproof.

In at least one embodiment, at least a portion of the functionality of the gaming system 100 may be remotely controlled, for example, using a remote control device (not shown). For example, in one embodiment, the remote control may be used by a bartender to activate, deactivate, raise and/or lower selected gaming unit(s).

In at least one embodiment, the footprint of the gaming system may be configured or designed to occupy about 12% (or less) of the bar top surface area that is typically allocated for use by a patron at the bar. This figure may be reduced even more when taking into account the duty cycle of use. For example, if it is assumed that the gaming unit is in use only 50% of the time, and consumes 12% of the surface area, this may be equated to a device consuming 6% of the surface area 100% of the time. Additionally, a utility factor value may also be factored in, which, for example, may relate to the usefulness of the bar top in each configuration (e.g., gaming unit raised v. gaming unit retracted).

Figure 1B:
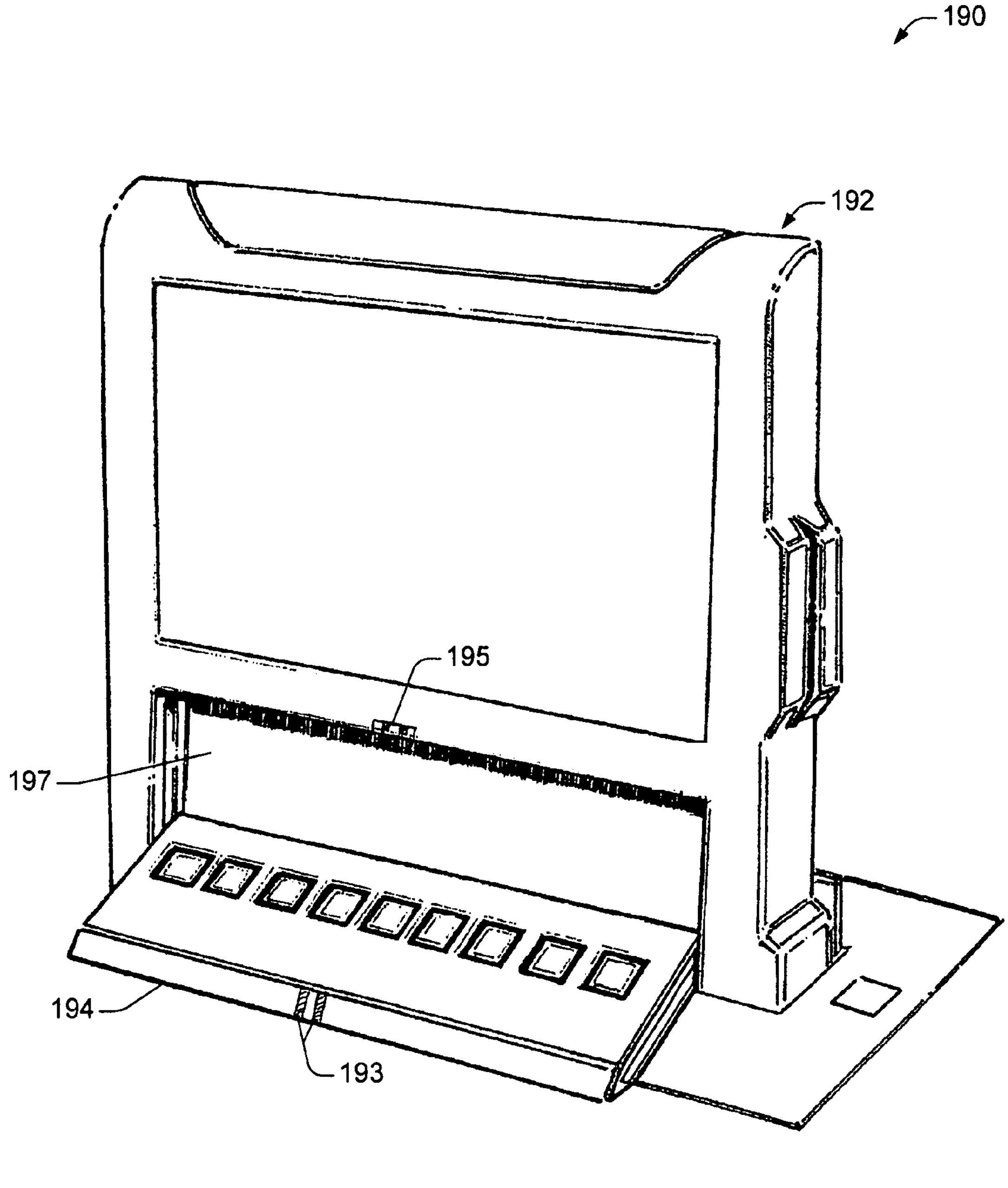

FIG. 1B shows a perspective view of an alternate embodiment of gaming system 190 having a retractable gaming unit 192. In at least one embodiment, gaming system 190 may be configured or designed to include components and/or functionality which is substantially similar to gaming unit 102 of FIG. 1A.

According to different embodiments, at least some button panels, keyboards and/or button panel/keyboard devices may include a rechargeable battery, a battery charging circuit, and a power interface (e.g., 193) which may be used to supply power for recharging the battery. In one embodiment, power may be supplied from the gaming unit to the button panel/keyboard device via at least one electrical interface such as, for example, one of the electrical interfaces 380, 390.

In some embodiments, such as that illustrated in FIG. 1B, power may be supplied from the gaming unit to the button panel/keyboard device via electrical contacts 193 and 195. For example, in one embodiment, when the gaming unit 192 is in its retracted position, the button panel/keyboard device 194 may be folded up into cavity 197, thereby allowing electrical contact regions 193 to make contact with electrical contact regions 195, thereby forming an electrical connection which allows power to be distributed to the button panel/keyboard device 194. In at least some embodiments, electrical contact regions 193 may be formed on each side of the button panel/keyboard device (e.g., button panel side and keyboard side) in order to allow either side of the device to make contact with contact regions 195.

In an alternate embodiment (not shown), the button panel/keyboard device 194 may be configured or designed to receive power during times when the gaming unit and button panel/keyboard device have been fully extended. For example, in one embodiment, a bottom portion of the button panel/keyboard device may be configured or designed to rest upon the bar top surface or mounting plate surface when the device is fully extended. The button panel/keyboard device may include electrical contact regions on its bottom portion which are able to make contact with (and form an electrical connection with) electrical contact regions located, for example, on the bar top surface and/or the mounting plate surface. In at least some embodiments, electrical contact regions may be formed on each side of the button panel/keyboard device in order to allow either side of the device to make contact with the contact regions located on the bar top surface and/or the mounting plate surface.

Figure 1C:
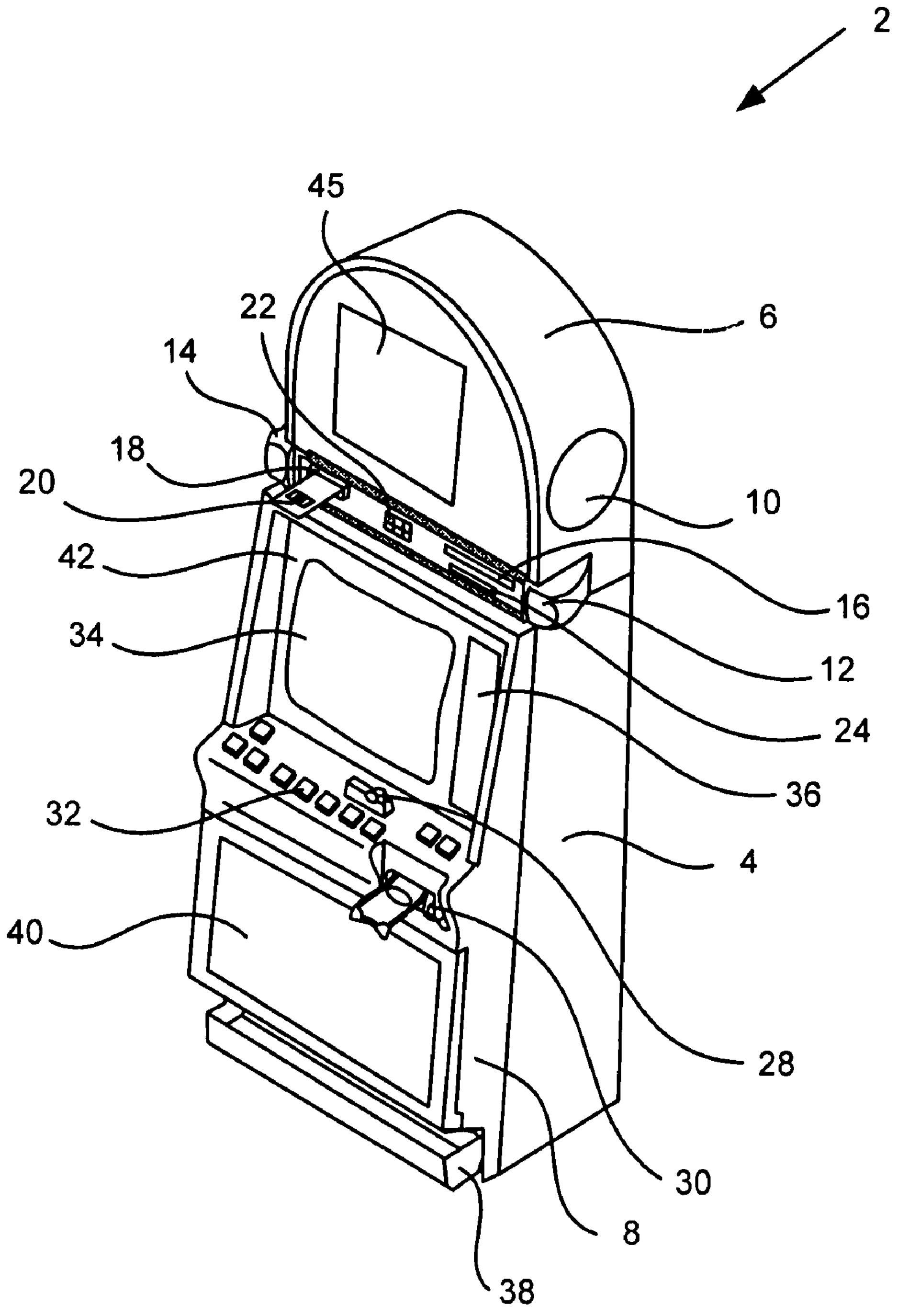

FIG. 1C shows a perspective view of an exemplary gaming unit 2 in accordance with an alternate embodiment. As illustrated in the example of FIG. 1C, gaming unit 2 includes a main cabinet 4, which may be fully retracted below the bar top or table top surface (not shown) using at least a portion of techniques similar to those described, for example, with respect to FIGS. 1A and 2. In at least one embodiment, gaming unit 2 may be part of a retractable gaming system or retractable gaming machine which may be installed into a bar top or table top.

In one embodiment, the main cabinet may include a door 8, which opens to provide access to the interior components of the gaming unit. According to different embodiments, the main cabinet may also house, for example, player-input switches or buttons 32, a coin acceptor 28, a bill validator 30, a coin tray 38, a belly glass 40.

The gaming unit may also include a video display monitor 34 and an information panel 36. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the gaming unit 2. According to a specific embodiment, the devices may be controlled by code executed by a master gaming controller which, for example, may be housed inside the main cabinet 4 of the gaming unit 2 or housed in a portion of the gaming system which is located below the bar top surface. In specific embodiments where it may be required that the code be periodically configured and/or authenticated in a secure manner, example embodiments may be used for accomplishing such tasks.

Many different types of games, including mechanical slot games, video slot games, video poker, video black jack, video pachinko and lottery, may be provided with gaming units of this invention. In particular, the gaming unit 2 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming unit 2 may be operable to allow a player to select a game of chance to play from a plurality of instances available on the gaming unit. For example, the gaming unit may provide a menu with a list of the instances of games that are available for play on the gaming unit and a player may be able to select from the list a first instance of a game of chance that they wish to play.

The various instances of games available for play on the gaming unit 2 may be stored as game software on a mass storage device in the gaming unit or may be generated on a remote gaming device but then displayed on the gaming unit. The gaming unit 2 may executed game software, such as but not limited to video streaming software that allows the game to be displayed on the gaming unit. When an instance is stored on the gaming unit 2, it may be loaded from the mass storage device into a RAM for execution. In some cases, after a selection of an instance, the game software that allows the selected instance to be generated may be downloaded from a remote gaming device, such as another gaming unit.

As illustrated in the example of FIG. 1C, the gaming unit 2 may include a top box 6, which sits on top of the main cabinet 4. The top box 6 houses a number of devices, which may be used to add features to a game being played on the gaming unit 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 45. The ticket printer 18 may be used to print tickets for a cashless ticketing system. Further, the top box 6 may house different or additional devices not illustrated in FIG. 1C. For example, the top box may include a bonus wheel or a back-lit silk screened panel which may be used to add bonus features to the game being played on the gaming unit. As another example, the top box may include a display for a progressive jackpot offered on the gaming unit. During a game, these devices are controlled and powered, in part, by circuitry (e.g. a master gaming controller) housed within the main cabinet 4 of the gaming unit 2.

It will be appreciated that gaming unit 2 is but one example from a wide range of gaming unit designs relating to example embodiments. For example, not all suitable gaming units have top boxes or player tracking features. Further, some gaming units have only a single game display. According to different embodiments, the size and shape of the retractable gaming unit may vary, for example, depending upon factors such as, for example: cost, space availability, location, ease of installation, desired features/components, etc.

In at least one embodiment, a game may be generated on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming unit or server may include gaming logic for commanding a remote gaming device to render an image from a virtual camera in a 3-D gaming environments stored on the remote gaming device and to display the rendered image on a display located on the remote gaming device. Thus, those of skill in the art will understand that example embodiments, as described below, can be deployed on most any gaming unit now available or hereafter developed.

Some preferred gaming systems, gaming machines, and/or gaming units of the present assignee are implemented with special features and/or additional circuitry that differentiates them from general-purpose computers (e.g., desktop PC's and laptops). For purposes of illustration, the following description is presented with reference to gaming machines, with the understanding that such description may also be applicable to gaming systems and/or gaming units. In at least one embodiment, a gaming machine or gaming system may include a first set of components which are visible to the user (e.g., game display, player panel, etc.), and a second set of components (e.g., master gaming controller, memory, etc.) which are not visible to the user.

Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming machines will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

For example, a watchdog timer is normally used in International Game Technology (IGT) gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed has been stored. This feature allows the game to recover operation to the current state of play in the event of a malfunction, loss of power, etc that occurred just prior to the malfunction. In at least one embodiment, the gaming machine is configured or designed to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

In order to ensure the success of atomic transactions relating to critical information to be stored in the gaming machine memory before a failure event (e.g., malfunction, loss of power, etc.), it is preferable that memory be used which includes one or more of the following criteria: direct memory access capability; data read/write capability which meets or exceeds minimum read/write access characteristics (such as, for example, at least 5.08 Mbytes/sec (Read) and/or at least 38.0 Mbytes/sec (Write)). Devices which meet or exceed the above criteria may be referred to as "fault-tolerant" memory devices, whereas it is which the above criteria may be referred to as "fault non-tolerant" memory devices.

Typically, battery backed RAM devices may be configured or designed to function as fault-tolerant devices according to the above criteria, whereas flash RAM and/or disk drive memory are typically not configurable to function as fault-tolerant devices according to the above criteria. Accordingly, battery backed RAM devices are typically used to preserve gaming machine critical data, although other types of non-volatile memory devices may be employed. These memory devices are typically not used in typical general-purpose computers.

Thus, in at least one embodiment, the gaming machine is configured or designed to store critical information in fault-tolerant memory (e.g., battery backed RAM devices) using atomic transactions. Further, in at least one embodiment, the fault-tolerant memory is able to successfully complete all desired atomic transactions (e.g., relating to the storage of gaming machine critical information) within a time period of 200 milliseconds (ms) or less. In at least one embodiment, the time period of 200 ms represents a maximum amount of time for which sufficient power may be available to the various gaming machine components after a power outage event has occurred at the gaming machine.

As described previously, the gaming machine may not advance from a first state to a second state until critical information that allows the first state to be reconstructed has been atomically stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Thus, for example, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion. Further details of a state based gaming system, recovery from malfunctions and game history are described in U.S. Pat. No. 6,804,763, titled "High Performance Battery Backed RAM Interface", U.S. Pat. No. 6,863,608, titled "Frame Capture of Actual Game Play," U.S. application Ser. No. 10/243,104, titled, "Dynamic NV-RAM," and U.S. application Ser. No. 10/758, 828, titled, "Frame Capture of Actual Game Play," each of which is incorporated by reference and for all purposes.

Another feature of gaming machines, such as IGT gaming computers, is that they often include unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices and/or trusted memory sources are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms included in the trusted device, the gaming machine is allowed to verify the authenticity of additional code and data that may be located in the gaming computer assembly, such as code and data stored on hard disk drives.

Other details related to trusted memory devices that may be used in example embodiments are described, for example, in U.S. Pat. No. 6,685,567, filed Aug. 8, 2001 and titled "Process Verification," and U.S. patent application Ser. No. 11/221,314, titled "Data Pattern Verification in a Gaming Machine Environment," filed Sep. 6, 2005, and U.S. patent application Ser. No. 09/824,621 titled "Method and Apparatus for Controlling Access to Areas of Gaming Machine" filed Apr. 2, 2001, each of which is incorporated herein by reference in its entirety and for all purposes.

In at least one embodiment, at least a portion of the trusted memory devices/sources may correspond to memory which cannot easily be altered (e.g., "unalterable memory") such as, for example, EPROMS, PROMS, Bios, Extended Bios, and/or other memory sources which are able to be configured, verified, and/or authenticated (e.g., for authenticity) in a secure and controlled manner.

According to a specific implementation, when a trusted information source is in communication with a remote device via a network, the remote device may employ a verification scheme to verify the identity of the trusted information source. For example, the trusted information source and the remote device may exchange information using public and private encryption keys to verify each other's identities. In another example of an embodiment, the remote device and the trusted information source may engage in methods using zero knowledge proofs to authenticate each of their respective identities. Details of zero knowledge proofs that may be used with example embodiments are described in US publication no. 2003/0203756, by Jackson, filed on Apr. 25, 2002 and entitled, "Authentication in a Secure Computerized Gaming System", which is incorporated herein in its entirety and for all purposes.

Gaming devices storing trusted information may utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Additional details relating to trusted memory devices/sources are described in U.S. patent application Ser. No. 11/078,966, entitled "SECURED VIRTUAL NETWORK IN A GAMING ENVIRONMENT", naming Nguyen et al. as inventors, filed on Mar. 10, 2005, herein incorporated in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. Details using a mass storage device that may be used with example embodiments are described, for example, in U.S. Pat. No. 6,149,522, herein incorporated by reference in its entirety for all purposes.

Returning to the example of FIG. 1C, when a user wishes to play the gaming unit 2, he or she inserts cash through the coin acceptor 28 or bill validator 30. Additionally, the bill validator may accept a printed ticket voucher which may be accepted by the bill validator 30 as indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 45 located in the top box.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming unit 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming unit 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18. In at least some embodiments, the player may elect to implement an electronic "cashed out" procedure, whereby credits, points, bonuses, and/or other awards earned by the player may be electronically transferred or deposited into the player's player tracking account.

Figure 2:
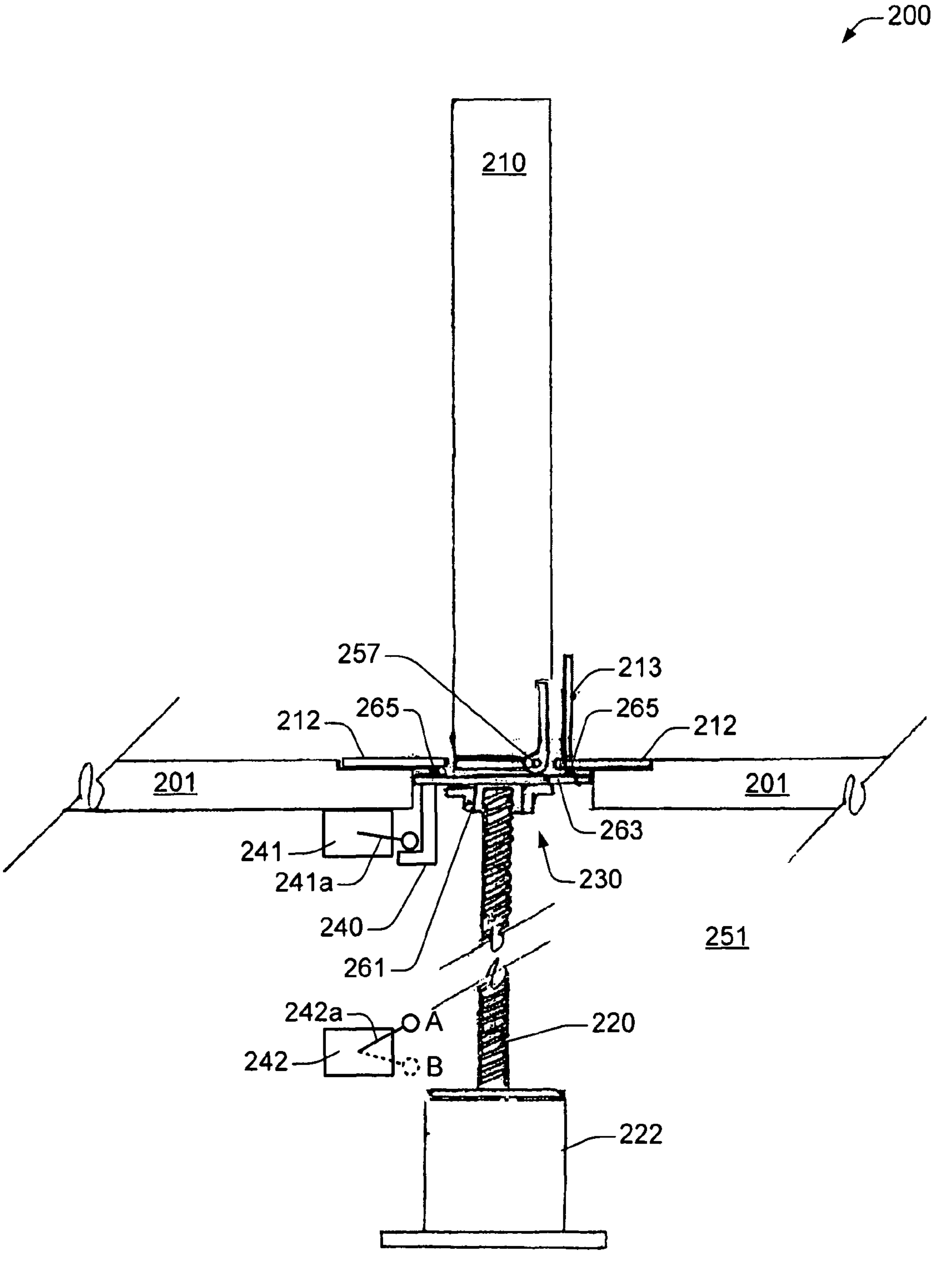
FIG. 2 shows a side view of an example embodiment of gaming system 200 which has been mounted into a bar top 201

FIG. 2 shows a side view of an example embodiment of gaming system 200 which has been mounted into a bar top 201 (or other suitable surface). As illustrated in the embodiment of FIG. 2, gaming unit 210 is shown in a raised position which extends above the surface of bar top 201. Various other components, devices and/or mechanisms are mounted below the bar top surface (e.g., within interior cavity 251).

In one embodiment, one or more lead screws 220 (such as, for example, precision rolled acme lead screws) and a stepper motor 222 are used to raise and lower the gaming unit 210. In one embodiment, the stepper motor 222 may drive two lead screws 220 at the same time through belting or gearing (not shown).

FIG. 2 also shows a cover plate 213 and a bezel or mounting plate 212. The mounting plate 212 includes an opening 230 for receiving the gaming unit, thereby allowing the gaming unit to be lowered below the bar top 201, and raised above the bar top 201 via opening 230.

In one embodiment, the stepper motor (or other type of driver) may be configured or designed to raise and/or lower the gaming unit. For example, in one embodiment, if the stepper motor turns clock wise the gaming unit 210 raises above the bar top or tabletop. If the stepper motor turns counter clock wise the gaming unit 210 retracts below the bar top or tabletop. A lever or bracket 240 may be used in conjunction with sensors 241 and/or 242 to generate appropriate control signals for controlling the raising, lowering and/or other desired movement(s) of the gaming unit.

For example, in one embodiment, as gaming unit 210 is being raised from its retracted position to its fully extended position, bracket 240 will eventually make contact with lever 241*a*, which, in response, may cause a control signal to be sent to stepper motor 222 to cause the stepper motor stop driving lead screws 220. Similarly, as gaming unit 210 is being lowered from its extended position to it's fully retracted position, bracket 240 will eventually make contact with lever 242*a* (e.g., causing lever 242*a* to move from position A to position B), which may cause a control signal to be sent to stepper motor 222 to cause the stepper motor stop driving lead screws 220. Thus, for example, in one embodiment, sensor 241 may be configured or designed as a limit switch operable to open the motor control circuitry when the gaming unit 210 reaches the fully raised position above the mounting plate. Similarly sensor 242 may be configured or designed as a limit switch operable open the motor control circuitry when the gaming unit 210 reaches the fully retracted position below the mounting plate. According to specific embodiments, when the gaming unit 210 is fully retracted, cover plate 213 extends across the opening that is left when the gaming unit 210 is fully retracted to thereby seal the opening in the mounting plate 212 to the interior cavity.

According to specific embodiments, cover plate 213 may include a spring loaded hinge which allows the cover plate to be automatically opened/closed as the gaming unit is raised/lowered out from or into the interior cavity.

As illustrated in FIG. 2, push plate 263 and gaskets 265 may be used to seal the mounting plate opening 230 from contamination, for example, when the gaming unit is in its fully extended position above the bar top.

Additionally, as illustrated in FIG. 2, a hinge 257 (e.g., friction hinge) or other pivoting mechanism may be provided to allow the gaming unit 210 to be tilted or adjusted, for example, to thereby adjust the viewing angle of the gaming unit display.

Figure 4:
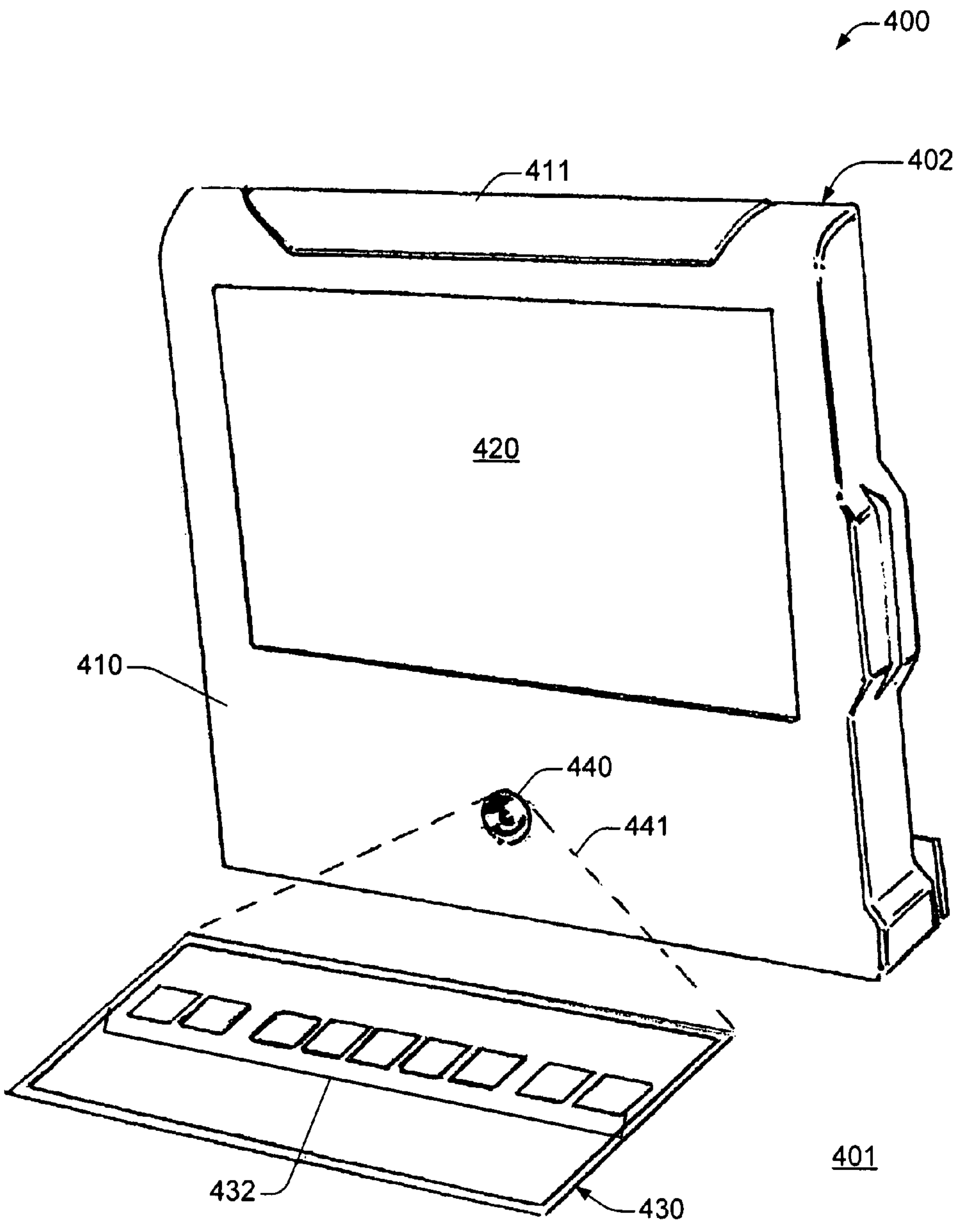
FIG. 4 shows a perspective view of an alternate embodiment of a gaming system 400 which includes a virtual keyboard system.

FIG. 4 shows a perspective view of an alternate embodiment of a gaming system 400 which includes a virtual keyboard system. As shown in FIG. 4, the gaming system 400 includes a retractable gaming unit 402. The gaming unit 402 may include a virtual keyboard system which may be operable to (1) project an image of a user input device (such as, for example, a keyboard, player panel, and/or other desired input device(s)) onto a surface, (2) detect user movement(s)/action (s) within the projection region, and/or (3) interpret the detected user movement(s)/action(s) to thereby generate user input data (such as, for example, RS232 serial keystroke output data).

For example, in at least one embodiment, the virtual keyboard system may include, but are not limited to, one or more of the following (and/or combination thereof): a light source; a pattern projector operable to project an image of a keyboard (or other device) on a surface; at least one sensor system which, for example, may be operable to detect hand and/or finger movement(s) relative to the pattern(s) displayed by the pattern projector.

According to specific embodiments, the sensor system may include a non-visible signal source (such as, for example, infra red light source), and a radar like motion/distance detection component which, for example, may be configured or designed to detect various characteristics (e.g., relative position, speed, velocity, acceleration, deceleration, direction, distance, etc.) associated with a player's hands, fingers and/or other objects placed within the region defined by the projected image (e.g., 430). In one embodiment, the sensor system may be implemented using electronic perception technology such as that developed by Canseta, Inc. (see, e.g., www.canesta.com).

In at least one embodiment, the pattern projector may be configured or designed to vary the size and/or shape of the projected image. For example, in one embodiment, the pattern projector may be configured or designed to project an image at about 30 centimeters and about a 50-degree angle. In another embodiment, at a 121.5 mm focal distance, the projected keyboard image may measure about 278 mm by 98 mm.

In at least one embodiment, the pattern(s) to be projected may be pre-etched into a lens (e.g., 440) of the projection mechanism. In some embodiments, the pattern projector may be configured or designed to project the image using diffractive optics.

According to specific embodiments, the pattern projector may be configured or designed to project many different image formats. For example, one image format may include a virtual player panel image (e.g., 430). Another image format may include a standard keyboard image. Other images projected may be different images that would relate to the different game(s) selected by the player and/or relate to the current state of the game (and/or other activities) being conducted at the gaming unit. For example, a keno-related image may be different then a blackjack-related image.

In one embodiment, the projected image may include a virtual button labeled "DEAL" (e.g., during a first state of game play) which, for example, may be pressed to initiate dealing of card(s) to the player. When the state of the game changes, the same virtual button label may dynamically and automatically change from "DEAL" to "DRAW". In another example, the projected image may include a virtual button labeled "SPIN" (e.g., during a first state of game play) which, for example, may be pressed to initiate spinning of one or more reels or wheels. When the state of the game changes (e.g., after a spinning reel game started to spin its video reels), the virtual button labeled "SPIN" may be dynamically and automatically changed to "STOP".

It will be appreciated that the above-described feature of dynamically changing buttons/keys may also be applied in non-virtual player panel/keyboard embodiments having buttons/switches which include respective electronic display screens (e.g., LCD display, OLED display, etc.) for displaying various types of content which may be viewed by a player or user.

Additionally, in at least one embodiment, the virtual keyboard system may be configured or designed to signal an audible "click" sound when it determines that one or more virtual key(s) (e.g., 432) of the have been pressed by the user.

In at least some embodiments, the display unit 420 may also be configured to include touchscreen interface, which may be used instead of, or in conjunction with virtual keyboard interface 430.

Figure 5:
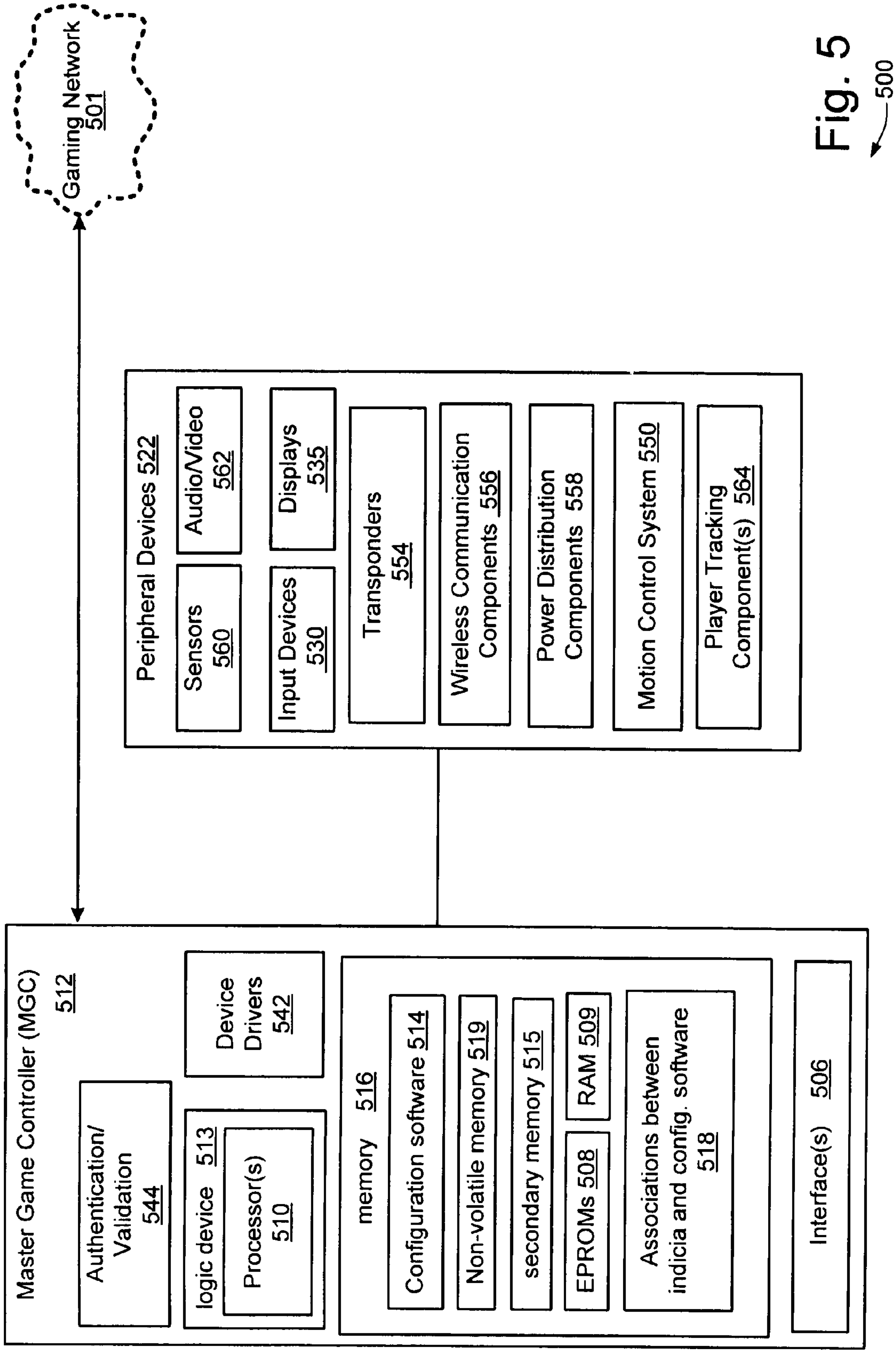
FIG. 5 is a simplified block diagram of an exemplary retractable bar top or table top gaming system 500 in accordance with a specific embodiment.

FIG. 5 is a simplified block diagram of an exemplary retractable bar top or table top gaming system 500 in accordance with a specific embodiment. As illustrated in the embodiment of FIG. 5, gaming system 500 includes at least one processor 510, at least one interface 506, and memory 516. According to different embodiments, at least a portion of the various components and devices illustrated and described with respect to FIG. 5 may be housed or located below the bar top or table top surface.

In one implementation, processor 510 and master game controller 512 are included in a logic device 513 enclosed in a logic device housing. The processor 510 may include any conventional processor or logic device configured to execute software allowing various configuration and reconfiguration tasks such as, for example: a) communicating with a remote source via communication interface 506, such as a server that stores authentication information or games; b) converting signals read by an interface to a format corresponding to that used by software or memory in the gaming system; c) accessing memory to configure or reconfigure game parameters in the memory according to indicia read from the device; d) communicating with interfaces, various peripheral devices 522 and/or I/O devices; e) operating peripheral devices 522 such as, for example, card readers, paper ticket readers, etc.; f) operating various I/O devices such as, for example, displays 535, input devices 530; etc. For instance, the processor 510 may send messages including game play information to the displays 535 to inform players of cards dealt, wagering information, and/or other desired information.

The gaming system 500 also includes memory 516 which may include, for example, volatile memory (e.g., RAM 509), non-volatile memory 519 (e.g., disk memory, FLASH memory, EPROMs, etc.), unalterable memory (e.g., EPROMs 508), etc. The memory may be configured or designed to store, for example: 1) configuration software 514 such as all the parameters and settings for a game playable on the gaming system; 2) associations 518 between configuration indicia read from a device with one or more parameters and settings; 3) communication protocols allowing the processor 510 to communicate with peripheral devices 522 and I/O devices 511; 4) a secondary memory storage device 515 such as a non-volatile memory device, configured to store gaming software related information (the gaming software related information and memory may be used to store various audio files and games not currently being used and invoked in a configuration or reconfiguration); 5) communication transport protocols (such as, for example, TCP/IP, USB, Firewire, IEEE1394, Bluetooth, IEEE 802.11x (IEEE 802.11 standards), hiperlan/2, HomeRF, ETHER Net, SAS, RS-485, optical, etc.) for allowing the gaming system to communicate with local and non-local devices using such protocols; etc. In one implementation, the master game controller 512 communicates using a serial communication protocol. A few examples of serial communication protocols that may be used to communicate with the master game controller include but are not limited to USB, RS-232, ETHER Net, RS-485, SAS, optical, Netplex (a proprietary protocol developed by IGT, Reno, Nev.), etc. In one embodiment, at least a portion of the critical data necessary for proper operation of the gaming system may be stored within memory 516.

A plurality of device drivers 542 may be stored in memory 516. Example of different types of device drivers may include device drivers for gaming system components, device drivers for peripheral components 522, etc. Typically, the device drivers 542 utilize a communication protocol of some type that enables communication with a particular physical device. The device driver abstracts the hardware implementation of a device. For example, a device drive may be written for each type of card reader that may be potentially connected to the gaming system. Examples of communication protocols used to implement the device drivers include Netplex, USB, SAS, RS-485, optical, Serial, ETHER Net, Firewire, I/O debouncer, direct memory map, serial, PCI, parallel, RF, Bluetooth™, near-field communications (e.g., using near-field magnetics), 802.11 (WiFi), etc. Netplex is a proprietary IGT standard while the others are open standards. According to a specific embodiment, when one type of a particular device is exchanged for another type of the particular device, a new device driver may be loaded from the memory 516 by the processor 510 to allow communication with the device. For instance, one type of card reader in gaming system 500 may be replaced with a second type of card reader where device drivers for both card readers are stored in the memory 516.

In some embodiments, the software units stored in the memory 516 may be upgraded as needed. For instance, when the memory 516 is a hard drive, new games, game options, various new parameters, new settings for existing parameters, new settings for new parameters, device drivers, and new communication protocols may be uploaded to the memory from the master game controller 512 or from some other external device. As another example, when the memory 516 includes a CD/DVD drive including a CD/DVD designed or configured to store game options, parameters, and settings, the software stored in the memory may be upgraded by replacing a first CD/DVD with a second CD/DVD. In yet another example, when the memory 516 uses one or more flash memory 519 or EPROM 508 units designed or configured to store games, game options, parameters, settings, the software stored in the flash and/or EPROM memory units may be upgraded by replacing one or more memory units with new memory units which include the upgraded software. In another embodiment, one or more of the memory devices, such as the hard-drive, may be employed in a game software download process from a remote software server.

In some embodiments, the gaming system 500 may also include various authentication and/or validation components 544 which may be used for authenticating/validating specified gaming system components such as, for example, hardware components, software components, firmware components, information stored in the gaming system memory 516, etc. Examples of various authentication and/or validation components are described in U.S. Pat. No. 6,620,047, entitled, "ELECTRONIC GAMING MACHINE HAVING AUTHENTICATION DATA SETS," incorporated herein by reference in its entirety for all purposes.

Peripheral devices 522 may include several device interfaces such as, for example: transponders 554, wire/wireless power distribution components 558, input device(s) 530, sensors 560, audio and/or video devices 562 (e.g., cameras, speakers, etc.), transponders 554, wireless communication components 556, wireless power components 558, player tracking components 564, motion control system 550, etc.

In at least one embodiment, motion control system 550 may include a plurality of different components or devices for imparting and/or controlling motion or movement of the retractable gaming unit. For example, in at least one embodiment, motion control system may include, for example: a motion control device operable to physically raise and lower the gaming unit, sensors (such as, for example, gaming unit position sensors 241, 242), a motion control device controller for controlling operation of the motion control device, and/or other desired components. In one embodiment, the controller may be operatively coupled to the MGC and/or other components/devices of the gaming system.

According to a specific embodiment, the motion control device(s) may be implemented using any number of different types of motion control devices (e.g., either open or closed loop) for translating the movable gaming unit. Examples of such motion control devices may include, but are not limited to: ballscrew and jacknut devices, belt and pulley devices, electromagnetic linear types of motion control devices, cam and follower devices, gear drives, leadscrews, etc. The drivers for such systems may include, for example, stepper motors, server motors, gear motors, pneumatic drivers, etc. Each of the different types of drivers may be implemented either with or without mechanical and electromechanical encoders and other feedback technologies, as desired.

Sensors 560 may include, for example, optical sensors, pressure sensors, moisture sensors, RF sensors, Infrared sensors, image sensors, thermal sensors, biometric sensors, etc. Such sensors may be used for a variety of functions such as, for example detecting the presence and/or identity of various persons (e.g., players, casino employees, etc.), devices (e.g., mobile devices), and/or systems within a predetermined proximity to the gaming system. In one implementation, at least a portion of the sensors 560 and/or input devices 530 may be implemented in the form of touch keys selected from a wide variety of commercially available touch keys used to provide electrical control signals. Alternatively, some of the touch keys may be implemented in another form which are touch sensors such as those provided by a touchscreen display. For example, in at least one implementation, the gaming system player displays and/or mobile device displays may include input functionality for allowing players to provide desired information (e.g., game play instructions and/or other input) to the gaming system, game table and/or other gaming system components using the touch keys and/or other player control sensors/buttons. Additionally, such input functionality may also be used for allowing players to provide input to other devices in the casino gaming network (such as, for example, player tracking systems, side wagering systems, etc.)

In at least one embodiment, one or more sensors may be provided to detect and/or monitor motion(s) or movement(s) of the movable gaming unit. For example, in one embodiment, position sensing devices (such as, for example, microswitches) may be used to monitor the positions of the gaming unit and to provide feedback to the motion control device, motion control device controller, and/or other components of the motion control system 550.

Wireless communication components 556 may include one or more communication interfaces having different architectures and utilizing a variety of protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetic communication protocols, etc. The communication links may transmit electrical, electromagnetic or optical signals which carry digital data streams or analog signals representing various types of information.

Power distribution components 558 may include, for example, components or devices which are operable for providing wired or wireless power to other devices. For example, in one implementation, the power distribution components 558 may include a magnetic induction system which is adapted to provide wireless power to one or more mobile devices near the gaming system. In one embodiment, a mobile device docking region may be provided which includes a power distribution component that is able to recharge a mobile electronic device without requiring metal-to-metal contact.

In at least one embodiment, power service may be provided to components of the gaming system via electrical wires which for example, may be routed to regions below the bar top or table top surface and/or within the interior cavity. According to specific embodiments, power distribution components 558 may include, for example, a power supply, power switches, power controllers, etc. For an example, in one embodiment, there may be a power service switch and power outlet located in the lower portion of the bar or table. The power switch may be activated by the movement of the gaming unit or video display unit (e.g., 535). For example, if the gaming unit is retracted, power may be shut off to a selected portion of the gaming system components. In at least one embodiment, even at times when power is shut off to a first selected group of gaming system components (e.g., display (s), player panel, etc.), power may be continuously provided to a second group of gaming system components (such as, for example, fingerprint readers, moisture sensors, player tracking card sensors, RFID detectors, etc.). In one embodiment, when presence of a player is detected (such as, for example, by detecting the player's player tracking card, by detecting the player's finger at the fingerprint reader, etc.) power may then be applied to selected gaming system components, which may included at least a portion of the first selected group of gaming system components. Such features facilitate power conservation, and may help to reduce heat buildup within the gaming unit, particularly at times when the gaming unit was not being used.

According to specific embodiments, gaming system 500 and include one or more displays 535. For example, in one embodiment, gaming system 500 may include a retractable display. In another embodiment, gaming system 500 may include a retractable gaming unit which houses a display (e.g., 120). In some embodiments, the gaming system may also include additional displays such as, for example, display 960 of FIG. 9. In at least one embodiment, gaming system 500 may include a video generator component operable to render and/or generate video content to be displayed on one or more of the displays 535. In one embodiment, The video generator component may be coupled to one or more of the gaming system the display unit(s) via, for example, LVDS (Low Voltage Differential Signaling) signaling and/or standard video cabling.

In other embodiments (not shown) other peripheral devices include: player tracking devices, card readers, bill validator/paper ticket readers, etc. Such devices may each comprise resources for handling and processing configuration indicia such as a microcontroller that converts voltage levels for one or more scanning devices to signals provided to processor 510. In one embodiment, application software for interfacing with peripheral devices 522 may store instructions (such as, for example, how to read indicia from a portable device) in a memory device such as, for example, non-volatile memory, hard drive or a flash memory.

In at least one implementation, the gaming system may include card readers such as used with credit cards, or other identification code reading devices to allow or require player identification in connection with play of the card game and associated recording of game action. Such a user identification interface can be implemented in the form of a variety of magnetic card readers commercially available for reading user-specific identification information. The user-specific information can be provided on specially constructed magnetic cards issued by a casino, or magnetically coded credit cards or debit cards frequently used with national credit organizations such as VISA™, MASTERCARD™, banks and/or other institutions.

The gaming system may include other types of participant identification mechanisms which may use a fingerprint image, eye blood vessel image reader, or other suitable biological information to confirm identity of the user. Still further it is possible to provide such participant identification information by having the dealer manually code in the information in response to the player indicating his or her code name or real name. Such additional identification could also be used to confirm credit use of a smart card, transponder, and/or player's mobile device.

It will be apparent to those skilled in the art that other memory types, including various computer readable media, may be used for storing and executing program instructions pertaining to the operation of gaming systems described herein. Because such information and program instructions may be employed to implement the systems/methods described herein, example embodiments may relate to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Example embodiments may also be embodied in a carrier wave traveling over an appropriate medium such as airwaves, optical lines, electric lines, etc. Examples of program instructions include both machine code, such as produced by a compiler, and files including higher level code that may be executed by the computer using an interpreter.

According to different embodiments, at least a portion of the various components and devices illustrated and described with respect to FIG. 5 may be housed or located below the bar top or table top surface. For example various design constraints and/or other criteria may be used to create different the gaming system embodiments, each of which being configured or designed to include different amounts and/or types of components which are able to be elevated above the bar top or table top. For example, in one embodiment the extendable/retractable portion of the gaming system may include only a movable display. In another embodiment, the extendable/retractable portion of the gaming system may include a video display unit and touchscreen, speakers, and candle. In a different embodiment the extendable/retractable portion of the gaming system may include a video display unit and touchscreen, speakers, candle, card reader, and keyboard/player panel. Additionally, in at least some embodiments, and may be preferable to configure or design the gaming system in a manner which reduces or minimizes heat buildup. For example, by locating the power supply under the bar top surface, and away from the retractable video display unit, heat buildup at or near the video display unit may be substantially reduced.

Figure 6A:
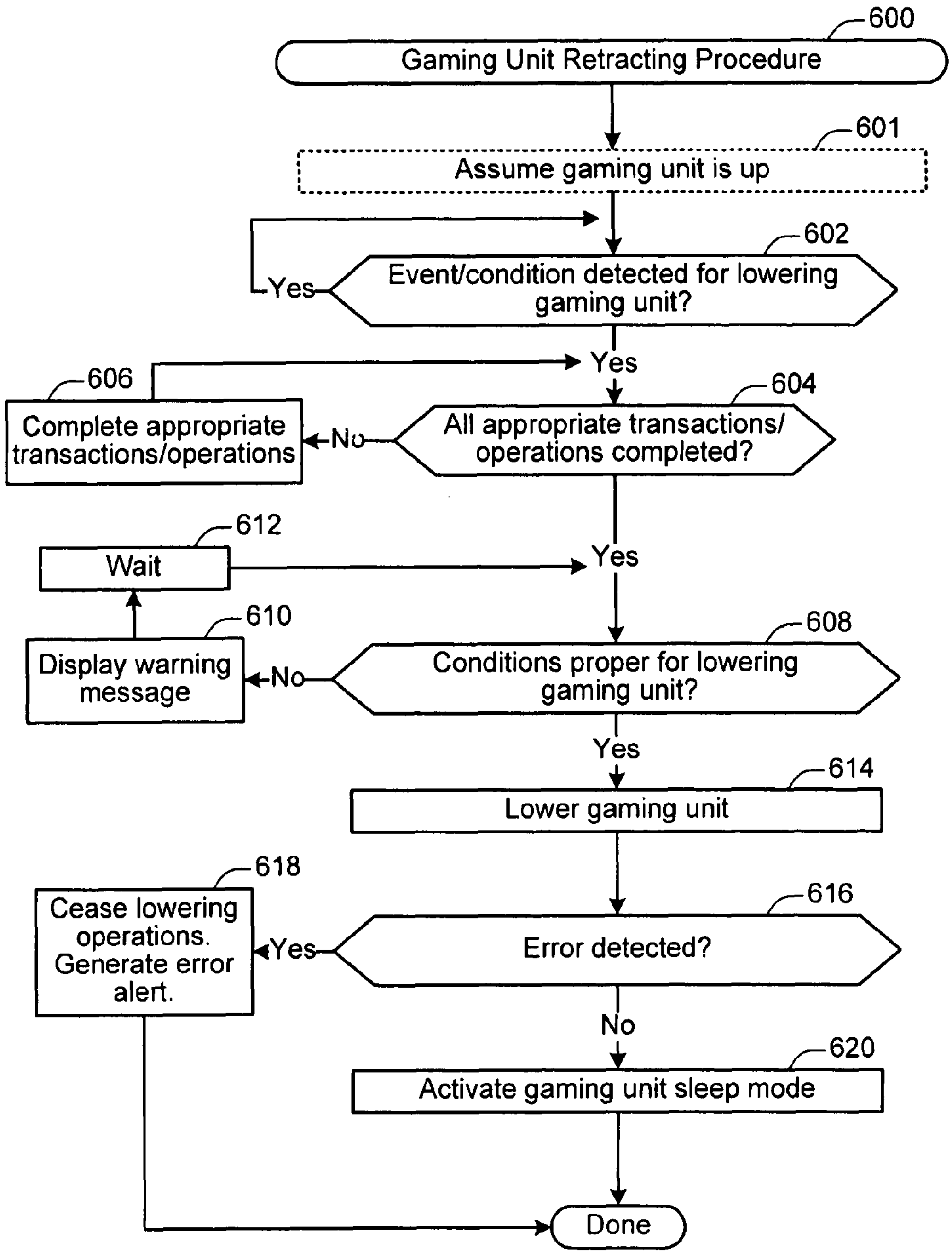
FIG. 6A shows a flow diagram of a Gaming Unit Retracting Procedure 600 in accordance with a specific embodiment.

FIG. 6A shows a flow diagram of a Gaming Unit Retracting Procedure 600 in accordance with a specific embodiment. According to specific embodiments, at least a portion of the Gaming Unit Retracting Procedure 600 may be implemented by devices and/or components of the gaming system 500 of FIG. 5.

Initially, as shown at 601, it is assumed that the gaming unit is in its "up" position (e.g., raised above the bar top or table top surface).

At 602, a determination is made as to whether one or more event(s) and/or condition(s) have been detected for triggering the lowering or retracting of the gaming unit. Examples of such conditions may include, but are not limited to, one or more of the following (or combination thereof):

- no detection of player;
- no detection of player's player tracking device within predetermined range;

player input;
dealer input;
remote input;
time/date based events;
player detected as not being within predetermined range;
no player activity with specified time period;
under age player detected;
player determined to be out of wagering credits;
timeout exceeded;
cashout request received;
error condition detected;
a no credits on gaming machine;
etc.

For example, in one embodiment, a user may request retraction of the gaming unit, for example, via a soft programmable button on the gaming unit display by activating a specified region of the touchscreen. Alternatively, retraction of the gaming unit may be initiated via an appropriate button on a remote control device which, for example, may be operated by the bar tender.

If at least one event(s) and/or condition(s) has been detected for triggering the lowering or retracting of the gaming unit, a determination may be made (604) as to whether all appropriate transaction(s)/operation(s) have been completed before the gaming unit is lowered. Examples of such transaction(s)/operation(s) may relate to, but are not limited to, one or more of the following (or combination thereof):

closing of player tracking session;
closing of player rating session;
completing cashout operation(s);
completing game play;
distributing winnings to player;
closing out bar tab;
closing out food tab;
completing electronic commerce transaction conducted via gaming unit;
closing of the establishment;
etc.

If it is determined that at least one identified transaction(s)/operation(s) should be completed before the gaming unit is allowed to be lowered, the gaming system may delay lowering of the gaming unit until it has determined or verified that identified transaction(s)/operation(s) have been completed (606). Additionally, one or more messages may be displayed to the user or player in order to facilitate completion of the identified transaction(s)/operation(s).

Another operation which may be performed before lowering the gaming unit is determining (608) whether conditions are proper for lowering the gaming unit.

According to specific embodiments, what constitutes "proper" conditions for lowering (and/or raising) the gaming unit may differ, for example, depending on various system components, design criteria, operating environments, etc. In at least one embodiment, different "proper" conditions may be defined by different sets of criteria. Each set of criteria may include, but not be limited to, one or more of the following (or combination thereof): detection (or lack thereof) of one or more specified events; detection (or lack thereof) of one or more specific conditions; detection (or lack thereof) of one or more signals; verification of specific data; and/or various other types of criteria described herein.

In at least one embodiment, proper conditions for lowering the gaming unit may be defined to include the non-detection (e.g., lack of detection) of any conditions which: (1) may result in harm or injury to the gaming system if the gaming unit were to be lowered; (2) may result in harm or injury to any person if the gaming unit were to be lowered; (3) may result in harm or injury to any object if the gaming unit were to be lowered; and/or (4) may result in corruption or loss of any critical data if the gaming unit were to be lowered. For example, a "high moisture" condition detected at the bar top surface or within the interior cavity may prevent the gaming unit from being lowered. In another example, a pressure sensor or light sensor may detect the presence of an object which may interfere with the lowering of the gaming unit.

In at least one embodiment, if it is determined that conditions are not proper for lowering the gaming unit, the gaming system may display (610) a warning message to the user or player advising the user or player that the gaming unit cannot be lowered until identified improper conditions have been corrected.

In other embodiments, other conditions may be defined for allowing or preventing the raising or lowering of the gaming unit. For example, in at least some embodiments, the casino may desire that the gaming unit remain raised during specified time periods. Other conditions and/or events for allowing or preventing the raising or lowering of the gaming unit may relate to one or more of the conditions and/or events described herein (such as, for example, one or more of the conditions/events described with respect to FIGS. 6A, 6B and/or 7).

Assuming that conditions are proper for lowering the gaming unit, lowering of the gaming unit may be initiated (614). In at least one embodiment, a visual and/or audible signal may be generated before the gaming unit is lowered.

In one embodiment, if an error is detected (e.g., 616) during the lowering of the gaming unit, the lowering operations may be halted (618) and an error alert message may be generated, for example, in order to alert appropriate personnel of the error event.

In at least one embodiment, when the gaming unit has been lowered into its fully retracted position, the gaming unit and/or other components/devices of the gaming system may be placed into a "sleep mode" or "power save" mode in order, for example, to conserve energy resources and/or to prolong the operating life of the various gaming system components/devices.

Figure 6B:
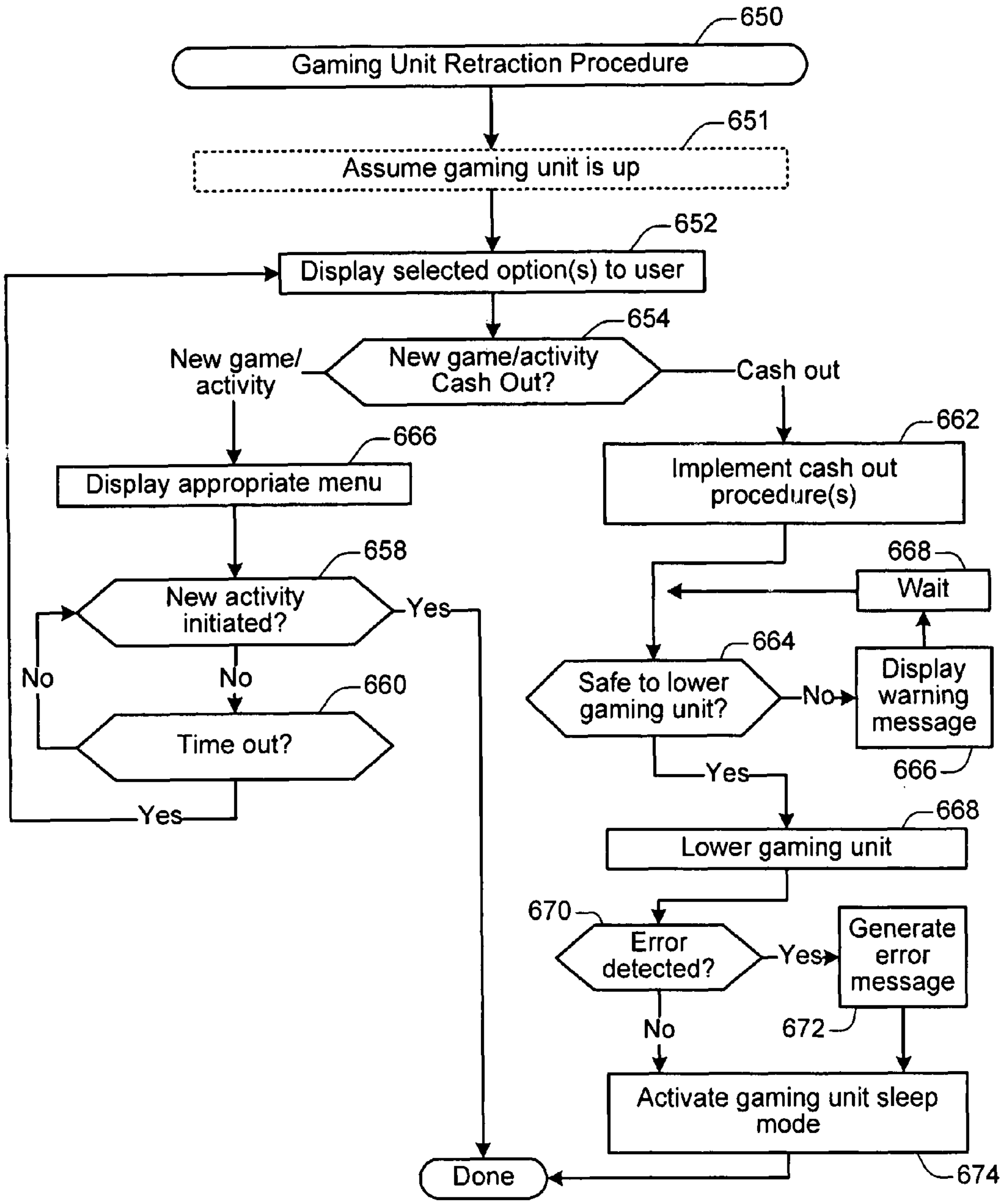
FIG. 6B shows a flow diagram of an alternate embodiment of a Gaming Unit Retracting Procedure 650.

FIG. 6B shows a flow diagram of an alternate embodiment of a Gaming Unit Retracting Procedure 650. According to specific embodiments, at least a portion of the Gaming Unit Retracting Procedure 650 may be implemented by devices and/or components of the gaming system 500 of FIG. 5.

Initially, as shown at 651, it is assumed that the gaming unit is in its "up" position (e.g., raised above the bar top or table top surface), and that the player has concluded game play and/or bonus play at the gaming unit.

As shown at 652, a list or menu of options may be presented to the player, which, for example, may include a first option to play a new game or activity and/or may include a second option to cash out.

If it is determined (e.g., at 654) that the player has selected the option for initiating a new game or activity, an appropriate menu (and/or other information) may be displayed (666) to the player for allowing the player to initiate a desired game-related activity or non-game related activity. In one embodiment, if the desired activity has not been initiated within a predetermined time period, a timeout event (e.g., 660) may occur, and flow may resume from operation 652.

If it is determined (e.g., at 654) that the player has selected the "cash out" option, one or more procedures may be implemented (662) for completing a player "cash out" operation. Examples of at least some procedures may include, but are not limited to, one or more of the following (and/or combination thereof):

reading/writing data from/to player's smart card (e.g., player tracking card, player's account card, etc.);
reading/writing data from/to player's electronic mobile device (e.g., wireless gaming device, PDA, cell phone, etc.);
confirming player identity (e.g., verifying/authenticating fingerprint of player via fingerprint reader);
accessing player's personal data and/or financial account data located at one or more remote system(s);
displaying one or more message to the player;
receiving additional input from player;
etc.

For example, according to one embodiment, before electronically transferring credits to a player tracking card or player account card, the gaming system may first request confirmation of the player's identity, for example, via fingerprint authentication.

Another operation which may be performed before lowering the gaming unit is determining (664) whether conditions are safe for lowering the gaming unit. In at least one embodiment, if it is determined that conditions are not safe for lowering the gaming unit, the gaming system may display (666) a warning message to the user or player advising the user or player that the gaming unit cannot be lowered until unsafe conditions have been corrected.

Assuming that conditions are safe for lowering the gaming unit, lowering of the gaming unit may be initiated (668). In at least one embodiment, a visual and/or audible signal may be generated before the gaming unit is lowered.

In one embodiment, if an error is detected during the lowering of the gaming unit, the lowering operations may be halted, and an error alert message may be generated, for example, in order to alert appropriate personnel of the error event.

As shown at 674, the gaming unit and/or other components/devices of the gaming system may be placed into a "sleep mode" or "power save" mode in order, for example, to conserve energy resources and/or to prolong the operating life of the various gaming system components/devices.

Figure 7:
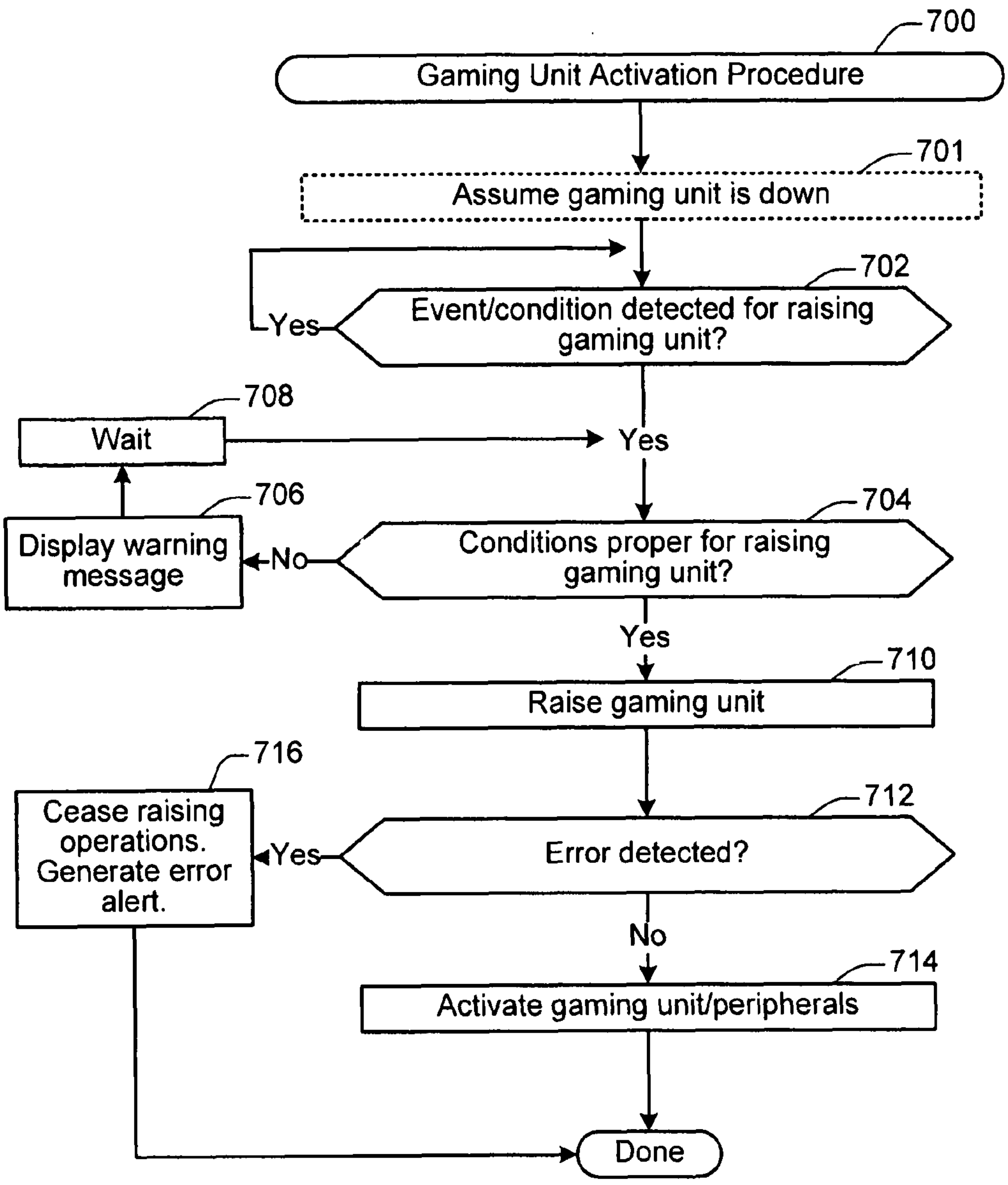
FIG. 7 shows a flow diagram of a Gaming Unit Activation Procedure 700 in accordance with a specific embodiment.

FIG. 7 shows a flow diagram of a Gaming Unit Activation Procedure 700 in accordance with a specific embodiment. According to specific embodiments, at least a portion of the Gaming Unit Activation Procedure 700 may be implemented by devices and/or components of the gaming system 500 of FIG. 5.

Initially, as shown at 701, it is assumed that the gaming unit is in its "retracted" position (e.g., retracted below the bar top or table top surface).

At 702, a determination is made as to whether one or more event(s) and/or condition(s) have been detected for triggering the raising or extending the gaming unit. According to specific embodiments, a variety of different events (and/or some combination thereof) may be used for triggering the raising or extending of the gaming unit. Such events may include, for example, but are not limited to, one or more of the following:
physical proximity of player and/or player tracking device detected as satisfying predetermined criteria;
player tracking device detected within specified zone of player station area;
appropriate player input detected (e.g., player pushes button, inserts card into reader, etc.);
appropriate casino employee input detected;
specified time constraints detected as being satisfied (e.g., begin player tracking session at next round of play);
presence of player detected at player station;
player identity determined (e.g., through the use of directional RFID; through placement of player tracking media on a designated spot at a table game; etc.);
detection of continuous presence of player tracking media for a predetermined amount of time;
etc.

For example, in one embodiment, a user or player may activate and raise the gaming unit, for example, by placing his or her finger on the fingerprint reader. Alternatively, the player may insert (or place) his or her player tracking card at a designated location of the gaming device in order to activate and raise the gaming unit. In one embodiment, instructions for activating the gaming unit may be displayed to the user or player, for example, via display 960 (FIG. 9).

As shown at 708, a determination may be made as to whether conditions are proper for raising the gaming unit.

In at least one embodiment, proper conditions for raising the gaming unit may be defined to include the non-detection (e.g., lack of detection) of any conditions which: (1) may result in harm or injury to the gaming system if the gaming unit were to be raised; (2) may result in harm or injury to any person if the gaming unit were to be raised; (3) may result in harm or injury to any object if the gaming unit were to be raised; and/or (4) may result in corruption or loss of any critical data if the gaming unit were to be raised. For example, a "high moisture" condition detected at the bar top surface or within the interior cavity may prevent the gaming unit from being raised. In another example, a pressure sensor or light sensor may detect the presence of an object which may interfere with the raising of the gaming unit.

In at least one embodiment, if it is determined that conditions are not proper for raising the gaming unit, the gaming system may display (706) a warning message to the user or player advising the user or player that the gaming unit cannot be raised until identified improper conditions have been corrected. In one embodiment, such warning messages may be displayed, for example, via display 960 (FIG. 9).

Assuming that conditions are proper for raising the gaming unit, raising of the gaming unit may be initiated (710). In at least one embodiment, a visual and/or audible signal may be generated before the gaming unit is raised.

In one embodiment, if an error is detected (e.g., 712) during the raising of the gaming unit, the raising operations may be halted (716) and an error alert message may be generated, for example, in order to alert appropriate personnel of the error event.

In at least one embodiment, when the gaming unit has been raised into its fully extended position, the gaming unit and/or other components/devices of the gaming system may be activated (e.g., awakened out of sleep mode) for normal operation. In at least one embodiment, the gaming system may automatically access player-related information from the player's player tracking card and/or from a remote player tracking system in order to determine, for example, the player's game play and/or wagering preferences. In one embodiment, the gaming system may automatically identify and activate (for game play at the gaming unit) at least one game which is preferred by the currently identified player.

For example, in one embodiment, in one embodiment, the gaming system may reads information from the player's player tracking card, and check to see if the player is a registered member of the casino's player tracking system. If the player is a registered member of the player tracking system, the gaming unit may display a welcome message to the player. Additionally the gaming system may automatically and dynamically configure the gaming unit according to the player's preferred gaming preferences.

In one embodiment, for example, where the gaming system is configured or designed to operate via a cashless system, if the player is not a registered member of the player tracking system, the gaming unit may be configured to operate in a non gaming mode.

According to a specific embodiment, the retractable gaming unit may be configured or designed to function as game service user interface device (GSUID) and a number of input and output devices. The GSUID is generally comprised of a display screen which may display a number of game service interfaces. These game service interfaces are generated on the display screen by a microprocessor of some type within the GSUID.

According to specific embodiments, the game service interfaces may be used to provide a variety of game service transactions and gaming operations services. The game service interfaces, including a login interface, an input/output interface, a transaction reconciliation interface, a ticket validation interface, a prize services interfaces, a food services interface, an accommodation services interfaces, a gaming operations interfaces, a multi-game/multi-denomination meter data transfer interface, etc. Each interface may be accessed via a main menu with a number of sub-menus that allow a game service representative to access the different display screens relating to the particular interface. Using the different display screens within a particular interface, the game service representative may perform various operations needed to provide a particular game service. For example, the login interface may allow the game service representative to enter a user identification of some type and verify the user identification with a password. When the display screen is a touch screen, the user may enter the user/operator identification information on a display screen comprising the login interface using the input stylus and/or using the input buttons. Using a menu on the display screen of the login interface, the user may select other display screens relating to the login and registration process. For example, another display screen obtained via a menu on a display screen in the login interface may allow the GSUID to scan a fingerprint of the game service representative for identification purposes or scan the fingerprint of a game player.

The user identification information and user validation information may allow the game service representative to access all or some subset of the available game service interfaces available on the GSUID. For example, certain users, after logging into the GSUID (e.g. entering a user identification and a valid user identification information), may be able to access a variety of different interfaces, such as, for example, one or more of: input/output interface, communication interface, food services interface, accommodation services interface, prize service interface, gaming operation services interface, transaction reconciliation interface, voice communication interface, gaming device performance or metering data transfer interface, etc.; and perform a variety of services enabled by such interfaces. While other users may be only be able to access the award ticket validation interface and perform EZ pay ticket validations. The GSUID may also output game service transaction information to a number of different devices (e.g., card reader, printer, storage devices, gaming units and remote transaction servers, etc.).

In addition to the features described above, various embodiments of retractable gaming units described herein may also include additional functionality for displaying, in real-time, filtered information to the user based upon a variety of criteria such as, for example, geolocation information, casino data information, player tracking information, etc.

Additional details about other gaming system architectures, features and/or components are described, for example, in U.S. patent application Ser. No. 10/040,239, entitled, "GAME DEVELOPMENT ARCHITECTURE THAT DECOUPLES THE GAME LOGIC FROM THE GRAPHICS LOGIC," and published on Apr. 24, 2003 as U.S. Patent Publication No. 20030078103, incorporated herein by reference in its entirety for all purposes.

Figure 8:
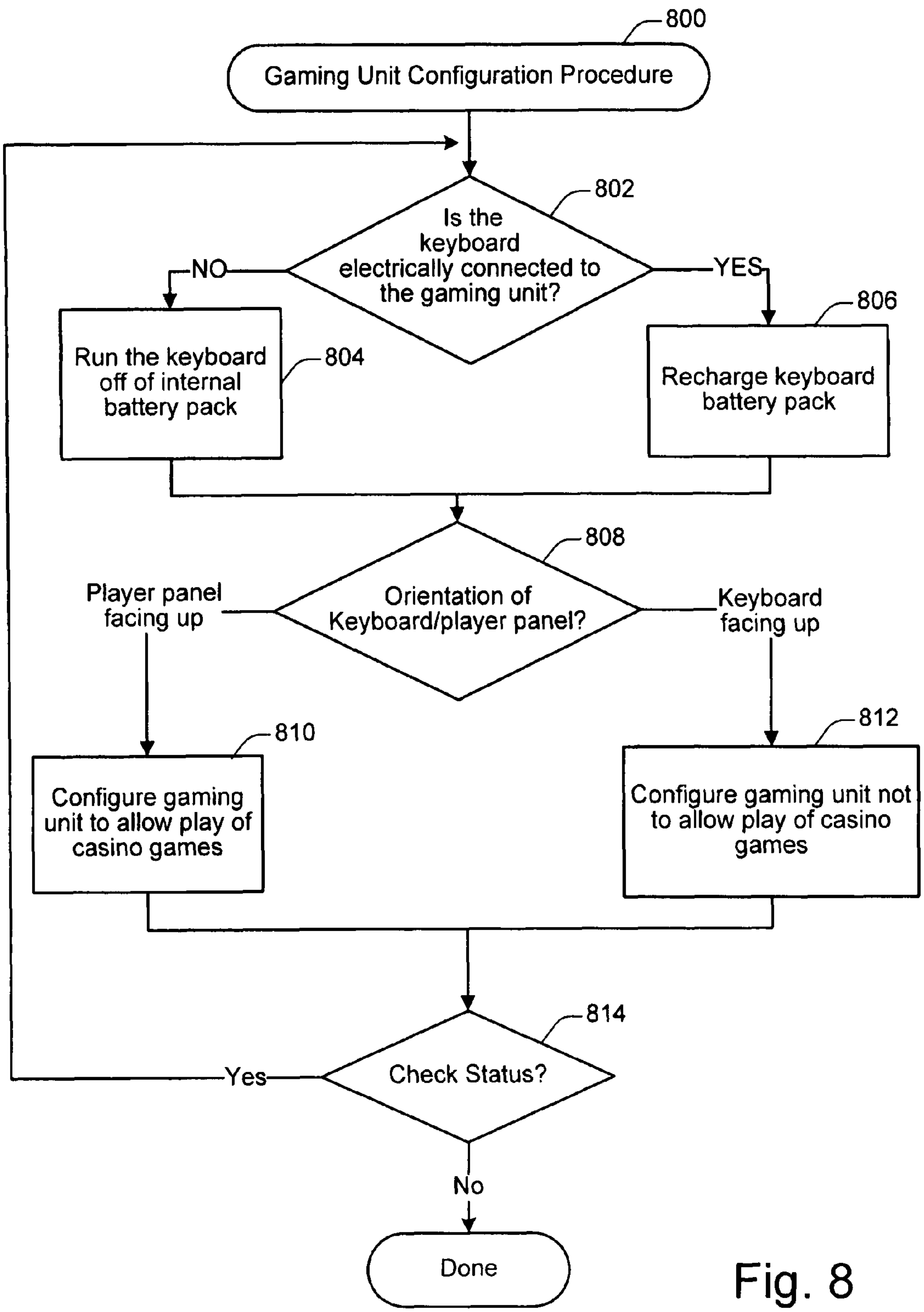
FIG. 8 is a flow diagram of a Gaming Unit Configuration Procedure 800 in accordance with a specific embodiment.

FIG. 8 is a flow diagram of a Gaming Unit Configuration Procedure 800 in accordance with a specific embodiment. According to specific embodiments, at least a portion of the Gaming Unit Configuration Procedure 800 may be implemented by devices and/or components of the gaming system 500 of FIG. 5.

According to specific embodiments where the gaming unit or gaming system includes a button panel and/or keyboard device, power 802 to the button panel/keyboard device may be provided via one or more different mechanisms.

For example, if it is determined (802) that the button panel/keyboard device is not electrically connected to the gaming unit the keyboard/player panel, power may be provided via an internal rechargeable battery pack. If it is determined (802) that the button panel/keyboard device is electrically connected to the gaming unit, power may be supplied to the button panel/keyboard device via the electrical connection. Additionally, power may also be supplied to a battery recharging circuit for recharging the internal battery pack. In other embodiments, power may be supplied for recharging the internal battery pack via a magnetic induction power source.

In one embodiment, a switch or other sensor mechanism may be used to determine whether or not the button panel/keyboard device is electrically connected or electrically coupled to gaming unit.

In at least some embodiments, the relative orientation of the button panel/keyboard device may be used to enable and/or disable various features or functionality of the gaming system.

For example, as shown at 808, a determination may be made to detect the current orientation of the button panel/keyboard device. In one embodiment, a gravity sensitive switch (e.g., located within the button panel/keyboard device) may be used to detect the orientation of the device.

According to one embodiment, if it is determined that the button panel or player panel side of the device is facing up, then the gaming unit may be automatically and dynamically configured (810) to allow wager-based game play activities to be conducted via the gaming unit. Alternatively, if it is determined that the keyboard side of the device is facing up, then the gaming unit may be automatically and dynamically configured (812) to not allow wager-based game play activities to be conducted via the gaming unit.

In at least some embodiments, the gaming unit may be configured or designed to perform a variety of other functions, even while in the non-game play mode of operation. Such other function may include, for example, casino intranet functions such as hotel reservations, show reservations, customer service, and the like. For example, in one embodiment, the gaming unit may be able to connect to the Internet to allow the sending and receiving of personal mail, browsing of the internet and the like.

In one embodiment, the gaming unit and button panel/keyboard device may each include wireless communication circuitry for performing bidirectional communication between the gaming unit and button panel/keyboard device. According to specific embodiments, such wireless communication may be implemented via use of a wireless link such as, for example, an optical link (e.g., IR link) and/or electromagnetic signal link (e.g., RF signal link, Bluetooth™ link, etc.).

As shown at 814, the Gaming Unit Configuration Procedure may periodically check or re-check the current status of the button panel/keyboard device characteristics in order, for example, to update aspects of the gaming system or gaming unit configuration.

Other System Embodiments

Figure 10:
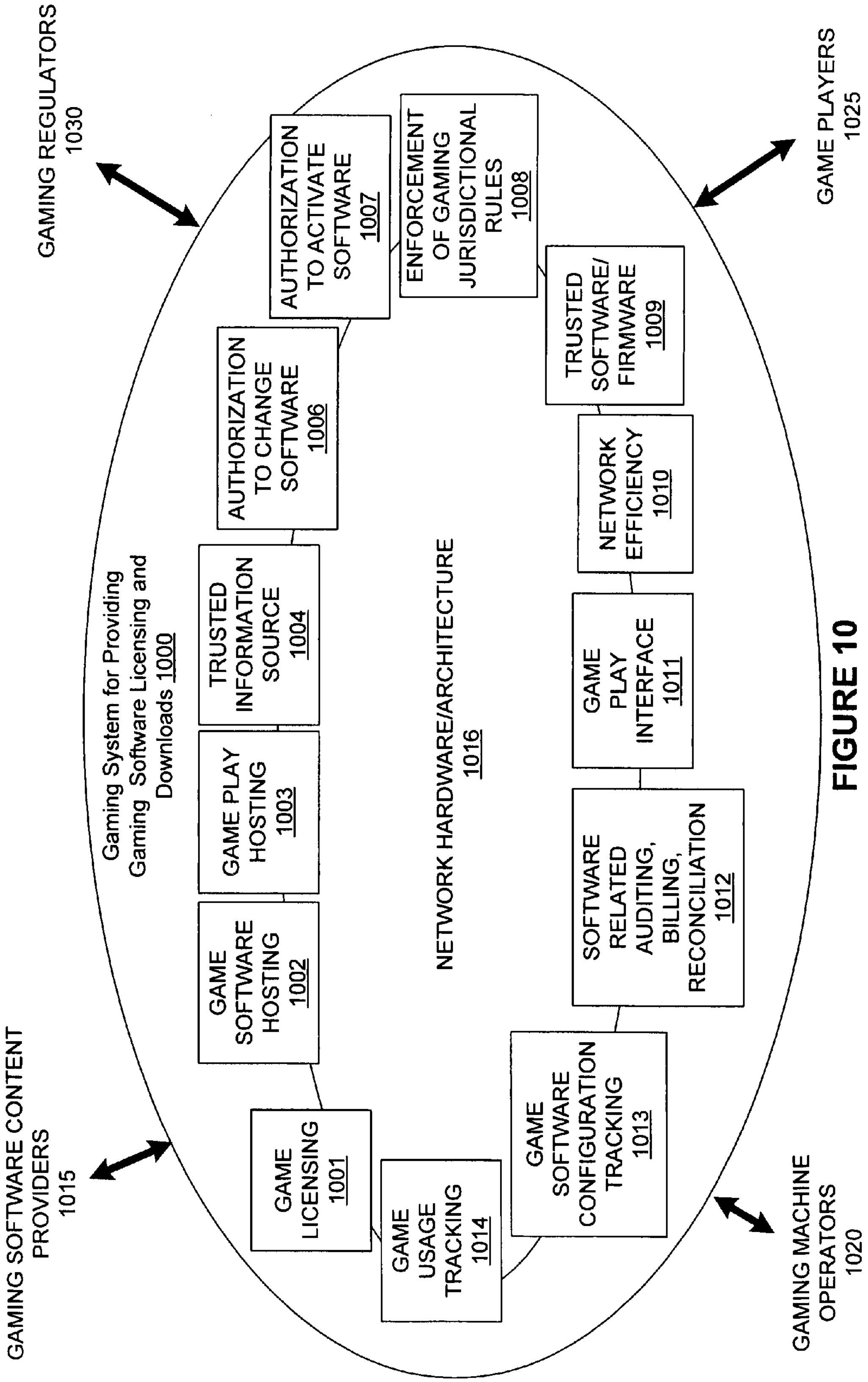
FIG. 10 shows a block diagram illustrating components of a gaming system 1000 which may be used for implementing various aspects of example embodiments.

FIG. 10 shows a block diagram illustrating components of a gaming system 1000 which may be used for implementing various aspects of example embodiments. In FIG. 10, the components of a gaming system 1000 for providing game software licensing and downloads are described functionally. The described functions may be instantiated in hardware, firmware and/or software and executed on a suitable device. In the system 1000, there may be many instances of the same function, such as multiple game play interfaces 1011. Nevertheless, in FIG. 10, only one instance of each function is shown. The functions of the components may be combined. For example, a single device may comprise the game play interface 1011 and include trusted memory devices or sources 1009.

The gaming system 1000 may receive inputs from different groups/entities and output various services and or information to these groups/entities. For example, game players 1025 primarily input cash or indicia of credit into the system, make game selections that trigger software downloads, and receive entertainment in exchange for their inputs. Game software content providers provide game software for the system and may receive compensation for the content they provide based on licensing agreements with the gaming machine operators. Gaming machine operators select game software for distribution, distribute the game software on the gaming devices in the system 1000, receive revenue for the use of their software and compensate the gaming machine operators. The gaming regulators 1030 may provide rules and regulations that must be applied to the gaming system and may receive reports and other information confirming that rules are being obeyed.

In the following paragraphs, details of each component and some of the interactions between the components are described with respect to FIG. 10. The game software license host 1001 may be a server connected to a number of remote gaming devices that provides licensing services to the remote gaming devices. For example, in other embodiments, the license host 1001 may 1) receive token requests for tokens used to activate software executed on the remote gaming devices, 2) send tokens to the remote gaming devices, 3) track token usage and 4) grant and/or renew software licenses for software executed on the remote gaming devices. The token usage may be used in utility based licensing schemes, such as a pay-per-use scheme.

In another embodiment, a game usage-tracking host 1014 may track the usage of game software on a plurality of devices in communication with the host. The game usage-tracking host 1014 may be in communication with a plurality of game play hosts and gaming machines. From the game play hosts and gaming machines, the game usage tracking host 1014 may receive updates of an amount that each game available for play on the devices has been played and on amount that has been wagered per game. This information may be stored in a database and used for billing according to methods described in a utility based licensing agreement.

The game software host 1002 may provide game software downloads, such as downloads of game software or game firmware, to various devious in the game system 1000. For example, when the software to generate the game is not available on the game play interface 1011, the game software host 1002 may download software to generate a selected game of chance played on the game play interface. Further, the game software host 1002 may download new game content to a plurality of gaming machines via a request from a gaming machine operator.

In one embodiment, the game software host 1002 may also be a game software configuration-tracking host 1013. The function of the game software configuration-tracking host is to keep records of software configurations and/or hardware configurations for a plurality of devices in communication with the host (e.g., denominations, number of paylines, paytables, max/min bets). Details of a game software host and a game software configuration host that may be used with example embodiments are described in co-pending U.S. Pat. No. 6,645,077, by Rowe, entitled, "Gaming Terminal Data Repository and Information System," filed Dec. 21, 2000, which is incorporated herein in its entirety and for all purposes.

A game play host device 1003 may be a host server connected to a plurality of remote clients that generates games of chance that are displayed on a plurality of remote game play interfaces 1011. For example, the game play host device 1003 may be a server that provides central determination for a bingo game play played on a plurality of connected game play interfaces 1011. As another example, the game play host device 1003 may generate games of chance, such as slot games or video card games, for display on a remote client. A game player using the remote client may be able to select from a number of games that are provided on the client by the host device 1003. The game play host device 1003 may receive game software management services, such as receiving downloads of new game software, from the game software host 1002 and may receive game software licensing services, such as the granting or renewing of software licenses for software executed on the device 1003, from the game license host 1001.

In particular embodiments, the game play interfaces or other gaming devices in the gaming system 1000 may be portable devices, such as electronic tokens, cell phones, smart cards, tablet PC's and PDA's. The portable devices may support wireless communications and thus, may be referred to as wireless mobile devices. The network hardware architecture 1016 may be enabled to support communications between wireless mobile devices and other gaming devices in gaming system. In one embodiment, the wireless mobile devices may be used to play games of chance.

The gaming system 1000 may use a number of trusted information sources. Trusted information sources 1004 may be devices, such as servers, that provide information used to authenticate/activate other pieces of information. CRC values used to authenticate software, license tokens used to allow the use of software or product activation codes used to activate to software are examples of trusted information that might be provided from a trusted information source 1004. Trusted information sources may be a memory device, such as an EPROM, that includes trusted information used to authenticate other information. For example, a game play interface 1011 may store a private encryption key in a trusted memory device that is used in a private key-public key encryption scheme to authenticate information from another gaming device.

When a trusted information source 1004 is in communication with a remote device via a network, the remote device will employ a verification scheme to verify the identity of the trusted information source. For example, the trusted information source and the remote device may exchange information using public and private encryption keys to verify each other's identities. In another example of an embodiment, the remote device and the trusted information source may engage in methods using zero knowledge proofs to authenticate each of their respective identities. Details of zero knowledge proofs that may be used with example embodiments are described in US publication no. 2003/0203756, by Jackson, filed on Apr. 25, 2002 and entitled, "Authentication in a Secure Computerized Gaming System, which is incorporated herein in its entirety and for all purposes.

Gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

The gaming system 1000 of example embodiments may include devices 1006 that provide authorization to download software from a first device to a second device and devices 1007 that provide activation codes or information that allow downloaded software to be activated. The devices, 1006 and 1007, may be remote servers and may also be trusted information sources. One example of a method of providing product activation codes that may be used with example embodiments is describes in previously incorporated U.S. Pat. No. 6,264,561.

A device 1006 that monitors a plurality of gaming devices to determine adherence of the devices to gaming jurisdictional rules 1008 may be included in the system 1000. In one embodiment, a gaming jurisdictional rule server may scan software and the configurations of the software on a number of gaming devices in communication with the gaming rule server to determine whether the software on the gaming devices is valid for use in the gaming jurisdiction where the gaming device is located. For example, the gaming rule server may request a digital signature, such as CRC's, of particular software components and compare them with an approved digital signature value stored on the gaming jurisdictional rule server.

Further, the gaming jurisdictional rule server may scan the remote gaming device to determine whether the software is configured in a manner that is acceptable to the gaming jurisdiction where the gaming device is located. For example, a maximum bet limit may vary from jurisdiction to jurisdiction and the rule enforcement server may scan a gaming device to determine its current software configuration and its location and then compare the configuration on the gaming device with approved parameters for its location.

A gaming jurisdiction may include rules that describe how game software may be downloaded and licensed. The gaming jurisdictional rule server may scan download transaction records and licensing records on a gaming device to determine whether the download and licensing was carried out in a manner that is acceptable to the gaming jurisdiction in which the gaming device is located. In general, the game jurisdictional rule server may be utilized to confirm compliance to any gaming rules passed by a gaming jurisdiction when the information needed to determine rule compliance is remotely accessible to the server.

Game software, firmware or hardware residing a particular gaming device may also be used to check for compliance with local gaming jurisdictional rules. In one embodiment, when a gaming device is installed in a particular gaming jurisdiction, a software program including jurisdiction rule information may be downloaded to a secure memory location on a gaming machine or the jurisdiction rule information may be downloaded as data and utilized by a program on the gaming machine. The software program and/or jurisdiction rule information may used to check the gaming device software and software configurations for compliance with local gaming jurisdictional rules. In another embodiment, the software program for ensuring compliance and jurisdictional information may be installed in the gaming machine prior to its shipping, such as at the factory where the gaming machine is manufactured.

The gaming devices in game system 1000 may utilize trusted software and/or trusted firmware. Trusted firmware/software is trusted in the sense that is used with the assumption that it has not been tampered with. For instance, trusted software/firmware may be used to authenticate other game software or processes executing on a gaming device. As an example, trusted encryption programs and authentication programs may be stored on an EPROM on the gaming machine or encoded into a specialized encryption chip. As another example, trusted game software, i.e., game software approved for use on gaming devices by a local gaming jurisdiction may be required on gaming devices on the gaming machine.

In example embodiments, the devices may be connected by a network 1016 with different types of hardware using different hardware architectures. Game software can be quite large and frequent downloads can place a significant burden on a network, which may slow information transfer speeds on the network. For game-on-demand services that require frequent downloads of game software in a network, efficient downloading is essential for the service to viable. Thus, in example embodiments, network efficient devices 1010 may be used to actively monitor and maintain network efficiency. For instance, software locators may be used to locate nearby locations of game software for peer-to-peer transfers of game software. In another example, network traffic may be monitored and downloads may be actively rerouted to maintain network efficiency.

One or more devices in example embodiments may provide game software and game licensing related auditing, billing and reconciliation reports to server 1012. For example, a software licensing billing server may generate a bill for a gaming device operator based upon a usage of games over a time period on the gaming devices owned by the operator. In another example, a software auditing server may provide reports on game software downloads to various gaming devices in the gaming system 1000 and current configurations of the game software on these gaming devices.

At particular time intervals, the software auditing server 1012 may also request software configurations from a number of gaming devices in the gaming system. The server may then reconcile the software configuration on each gaming device. In one embodiment, the software auditing server 1012 may store a record of software configurations on each gaming device at particular times and a record of software download transactions that have occurred on the device. By applying each of the recorded game software download transactions since a selected time to the software configuration recorded at the selected time, a software configuration is obtained. The software auditing server may compare the software configuration derived from applying these transactions on a gaming device with a current software configuration obtained from the gaming device. After the comparison, the software-auditing server may generate a reconciliation report that confirms that the download transaction records are consistent with the current software configuration on the device. The report may also identify any inconsistencies. In another embodiment, both the gaming device and the software auditing server may store a record of the download transactions that have occurred on the gaming device and the software auditing server may reconcile these records.

There are many possible interactions between the components described with respect to FIG. 10. Many of the interactions are coupled. For example, methods used for game licensing may affect methods used for game downloading and vice versa. For the purposes of explanation, details of a few possible interactions between the components of the system 1000 relating to software licensing and software downloads have been described. The descriptions are selected to illustrate particular interactions in the game system 1000. These descriptions are provided for the purposes of explanation only and are not intended to limit the scope of example embodiments described herein.

Although several preferred embodiments of this invention have been described in detail herein with reference to the accompanying drawings, it is to be understood that at least one embodiment is not limited to these precise embodiments, and that various changes and modifications may be effected therein by one skilled in the art without departing from the scope of spirit of at least one embodiment as defined in the appended claims.

It is claimed:

1. A gaming system configured or designed for use with a bar top or table top, the gaming system comprising:

a master gaming controller;

memory;

at least one interface for communicating with at least one other device in a gaming network; and a movable gaming device comprising an electronic display device for displaying a wager-based game played on the gaming system, the movable gaming device being operable to be lowered below an upper surface of the bar top or table top, the movable gaming device being further operable to be raised, at least partially, above the upper surface of the bar top or table top;

the gaming system being operable to:

control the wager-based game played on the gaming system;

detect an occurrence of at least one first condition or event for triggering lowering of the gaming device below the upper surface of the bar top or table top;

identify a first set of criteria which is to be satisfied before allowing the gaming device to be lowered;

determine whether the first set of criteria is satisfied;

delay lowering of the gaming device in response to determining that the first set of criteria is not satisfied, wherein the first set of criteria includes a first criteria specifying a non-detection of conditions which results in harm or injury to the gaming system when the gaming device is lowered; and raise a first portion of the gaming device above the upper surface of the bar top or table top in response to detecting at least one second condition or event.

2. The gaming system of claim 1 further comprising an input mechanism for receiving cash or an indicia of credit.

3. The gaming system of claim 1 wherein the electronic display device is a non-CRT type electronic display device.

4. The gaming system of claim 1 wherein the electronic display device is one of: an LCD electronic display device, an OLED electronic display device, an LED electronic display device, and a plasma electronic display device.

5. The gaming system of claim 1 further comprising:

a keyboard device which is removably attachable to the gaming device;

the keyboard device including a internal rechargeable power source.

6. The gaming system of claim 1 further comprising:

a user input device movably attached to the gaming device;

the user input device including a first side which includes a first plurality of keys or switches arranged to form a button panel type interface; and the user input device including a second side which includes a second plurality of keys or switches arranged to form a keyboard type interface.

7. The gaming system of claim 1 further comprising:

a virtual keyboard system, the virtual keyboard system comprising:

a light source;

a pattern projector operable to project an image of a keyboard interface on a surface; and at least one sensor system operable to detect user movements relative to the projected image, and to generate user input data using at least a portion of the detected user movements.

8. The gaming system of claim 1 further comprising:

a virtual player panel system, the virtual player panel system comprising:

a light source;

a pattern projector operable to project an image of a button type player panel interface on a surface; and at least one sensor system operable to detect user movements relative to the projected image, and to generate user input data using at least a portion of the detected user movements.

9. The gaming system of claim 1 further comprising:

a plurality of sensors for detecting an occurrence of at least one condition or event which may automatically trigger movement of the gaming device.

10. The gaming system of claim 1 further comprising:

a plurality of sensors for detecting an occurrence of at least one condition or event which may automatically prevent movement of the gaming device.

11. The gaming system of claim 1 further comprising:

a plurality of sensors for detecting an occurrence of at least one condition or event which may automatically trigger movement of the gaming device;

wherein the plurality of sensors includes at least one sensor selected from a group consisting of: a light sensor, a moisture sensor, and a pressure sensor.

12. The gaming system of claim 1 further comprising:

a mounting plate mounted into a portion of the bar top or table top, the mounting plate including an opening defined therein for receiving the movable gaming device;

the opening being configured or designed to enable at least the first portion the gaming device to be raised above the upper surface of the bar top or table top;

the opening being further configured or designed to enable the gaming device to be lowered below the upper surface of the bar top or table top.

13. A method of operating a bar top or table top gaming system, the method comprising:

controlling a wager-based game played on the gaming system;

detecting an occurrence of at least one first condition or event for triggering lowering of a gaming device below an upper surface of a bar top or table top;

identifying a first set of criteria which is to be satisfied before allowing the gaming device to be lowered;

determining whether the first set of criteria is satisfied;

delaying lowering of the gaming device in response to determining that the first set of criteria is not satisfied, wherein the first set of criteria includes a first criteria specifying a non-detection of conditions which results in harm or injury to the gaming system when the gaming device is lowered; and raising a first portion of the gaming device above the upper surface of the bar top or table top in response to detecting at least one second condition or event.

14. The method of claim 13 further comprising:

determining, before the gaming device is lowered, whether there are any transactions to be completed before the gaming device is lowered.

15. The method of claim 13 further comprising:

determining, before the gaming device is lowered, whether there are any transactions to be completed before the gaming device is lowered; and delaying lowering of the gaming device in response to detecting a first uncompleted transaction that is to be completed before the gaming device is lowered.

16. The method of claim 13 further comprising:

detecting an occurrence of the at least one second condition or event for triggering raising of at least a portion of the gaming device above the upper surface of the bar top or table top;

identifying a second set of criteria which is to be satisfied before allowing the gaming device to be raised;

determining whether the second set of criteria is satisfied;

delaying raising of the gaming device in response to determining that the second set of criteria is not satisfied; and raising the gaming device in response to determining that the second set of criteria is satisfied.

17. The method of claim 13 further comprising:

detecting an occurrence of the at least one second condition or event for triggering raising of at least a portion of the gaming device above the upper surface of the bar top or table top;

identifying a second set of criteria which is to be satisfied before allowing the gaming device to be raised;

determining whether the second set of criteria is satisfied; and delaying raising of the gaming device in response to determining that the second set of criteria is not satisfied;

wherein the second set of criteria includes a first criteria specifying a non-detection of conditions which may result in harm or injury to the gaming system if the gaming device were to be raised.

18. The method of claim 13 further comprising:

detecting an occurrence of the at least one second condition or event for triggering raising of at least a portion of the gaming device above the upper surface of the bar top or table top;

identifying a second set of criteria which is to be satisfied before allowing the gaming device to be raised;

determining whether the second set of criteria is satisfied; and delaying raising of the gaming device in response to determining that the second set of criteria is not satisfied;

wherein the second set of criteria includes a first criteria specifying a non-detection of conditions which may result in harm or injury to a person if the gaming device were to be raised.

19. The method of claim 13 further comprising:

detecting an occurrence of the at least one second condition or event for triggering raising of at least a portion of the gaming device above the upper surface of the bar top or table top;

identifying a second set of criteria which is to be satisfied before allowing the gaming device to be raised;

determining whether the second set of criteria is satisfied; and delaying raising of the gaming unit in response to determining that the second set of criteria is not satisfied;

wherein the second set of criteria includes a first criteria specifying a non-detection of conditions which may result in corruption or loss of critical data if the gaming device were to be raised.

20. The method of claim 13 further comprising:

detecting an occurrence of the at least one second condition or event for triggering raising of at least a portion of the gaming device above the upper surface of the bar top or table top;

identifying a second set of criteria which is to be satisfied before allowing the gaming device to be raised; and determining whether the second set of criteria is satisfied; and delaying raising of the gaming device in response to determining that the second set of criteria is not satisfied;

wherein the second set of criteria includes a first criteria specifying a non-detection of conditions which may result in harm or injury to an object if the gaming device were to be raised.

* * * * *